United States Patent
Bernart et al.

(10) Patent No.: US 9,308,789 B2
(45) Date of Patent: Apr. 12, 2016

(54) HITCH BALL MOUNT AND METHOD OF FORMING THE HITCH BALL MOUNT

(71) Applicant: Cequent Consumer Products, Inc., Solon, OH (US)

(72) Inventors: Francis Bernart, North Canton, OH (US); Thomas DePietro, Solon, OH (US)

(73) Assignee: Cequent Consumer Products, Solon, OH (US)

( * ) Notice: Subject to any disclaimer, the term of this patent is extended or adjusted under 35 U.S.C. 154(b) by 0 days.

(21) Appl. No.: 13/649,700

(22) Filed: Oct. 11, 2012

(65) Prior Publication Data

US 2013/0093163 A1  Apr. 18, 2013

Related U.S. Application Data

(60) Provisional application No. 61/545,878, filed on Oct. 11, 2011.

(51) Int. Cl.
  *B60D 1/06* (2006.01)
  *B60D 1/52* (2006.01)

(52) U.S. Cl.
  CPC ... *B60D 1/06* (2013.01); *B60D 1/52* (2013.01)

(58) Field of Classification Search
  USPC ...................................... 280/504, 511, 491.1
  See application file for complete search history.

(56) References Cited

U.S. PATENT DOCUMENTS

| D157,643 | S | 3/1950 | Swaisgood |
|---|---|---|---|
| 5,265,899 | A | 11/1993 | Harrison |
| 5,725,229 | A | 3/1998 | McWethy |
| D397,067 | S | 8/1998 | McCoy et al. |
| 5,873,594 | A | 2/1999 | McCoy et al. |
| 6,010,142 | A | 1/2000 | McCoy et al. |
| D431,216 | S | 9/2000 | Belinky |
| 6,139,043 | A | 10/2000 | Gries et al. |
| 6,186,531 | B1 | 2/2001 | Parent |
| D443,567 | S | 6/2001 | Weir et al. |
| 6,460,870 | B2 | 10/2002 | Moss |

(Continued)

FOREIGN PATENT DOCUMENTS

| CA | 2685712 | 11/2009 |
|---|---|---|
| TW | 200613159 A | 5/2006 |

OTHER PUBLICATIONS

Reese Complete 2010 Catalog (7.62 MB), available at https://web.archive.org/web/20101128193939/http://reeseprod.com/content/downloads/catalogs/Cequent_Receiver_2010_Catalog.pdf (Copyright 2010, "Rev A, Dec. 2009").*

(Continued)

*Primary Examiner* — Joseph Rocca
*Assistant Examiner* — Gabriela C Craciun
(74) *Attorney, Agent, or Firm* — McDonald Hopkins LLC

(57) ABSTRACT

A hitch ball mount is shown and described. The hitch ball mount may include a generally tubular body having first and second end portions, the first end portion engageable with a hitch receiver of a towing vehicle, and a drop portion monolithic with the tubular body and formed between the first and second end portions of the tubular member. The hitch ball mount may further include a hitch ball mounting portion monolithic with the drop portion and tubular body, the hitch ball mounting portion formed at the second end portion of the tubular member and extending from the drop portion, where a hitch ball is selectively attachable to the hitch ball mounting portion.

44 Claims, 33 Drawing Sheets

(56) References Cited

U.S. PATENT DOCUMENTS

| | | |
|---|---|---|
| D469,723 S * | 2/2003 | McCoy et al. ............ D12/162 |
| D472,189 S | 3/2003 | McCoy et al. |
| D473,827 S | 4/2003 | McCoy et al. |
| D475,327 S | 6/2003 | McCoy et al. |
| 6,581,953 B2 * | 6/2003 | Jerry ............................ 280/486 |
| 6,616,168 B2 | 9/2003 | Belinky |
| 6,709,002 B2 * | 3/2004 | Tambornino ................ 280/511 |
| 6,712,381 B1 | 3/2004 | Moss |
| 6,783,144 B2 | 8/2004 | McCoy et al. |
| 6,789,815 B2 | 9/2004 | Moss et al. |
| 6,896,282 B1 | 5/2005 | McKinley |
| 6,974,148 B2 | 12/2005 | Moss et al. |
| 6,983,950 B2 | 1/2006 | McCoy et al. |
| 7,004,492 B2 | 2/2006 | Moss et al. |
| 7,029,022 B2 | 4/2006 | Moss |
| 7,052,778 B2 * | 5/2006 | Sorgi ............................ 428/600 |
| 7,125,036 B2 | 10/2006 | Moss et al. |
| 7,195,269 B2 * | 3/2007 | Tambornino ............... 280/491.1 |
| 7,204,505 B2 | 4/2007 | Moss |
| 7,419,177 B2 * | 9/2008 | Kottke et al. ................ 280/511 |
| 7,641,214 B2 * | 1/2010 | Kahl ........................... 280/446.1 |
| 7,661,694 B2 * | 2/2010 | Krespach et al. ............. 280/511 |
| D613,208 S | 4/2010 | McCoy |
| 7,690,672 B2 | 4/2010 | Scruggs |
| 7,819,416 B2 | 10/2010 | Moss |
| 8,011,685 B2 | 9/2011 | Belinky |
| 8,596,664 B2 * | 12/2013 | Lahn ............................ 280/506 |
| 2002/0113405 A1 * | 8/2002 | Moss et al. .................. 280/416.1 |
| 2003/0052472 A1 | 3/2003 | Moss et al. |
| 2003/0218314 A1 * | 11/2003 | Moss .......................... 280/491.1 |
| 2005/0067812 A1 * | 3/2005 | Moss et al. ................. 280/416.1 |
| 2007/0187447 A1 | 8/2007 | Hamann |
| 2008/0073872 A1 | 3/2008 | Scott |
| 2009/0039619 A1 | 2/2009 | Gries |
| 2009/0295123 A1 | 12/2009 | Good |
| 2011/0181022 A1 | 7/2011 | Gries |

OTHER PUBLICATIONS

Drawing Tyco Electronics, Terminal Power—Feb. 28, 1990 /Rev Y Nov. 12, 2003.*
Ampower Catalog—Tyco ELectroncis 2001 Copyright Date.*
International Search Report for PCT US2012/059762 mailed Jan. 18, 2013.

* cited by examiner

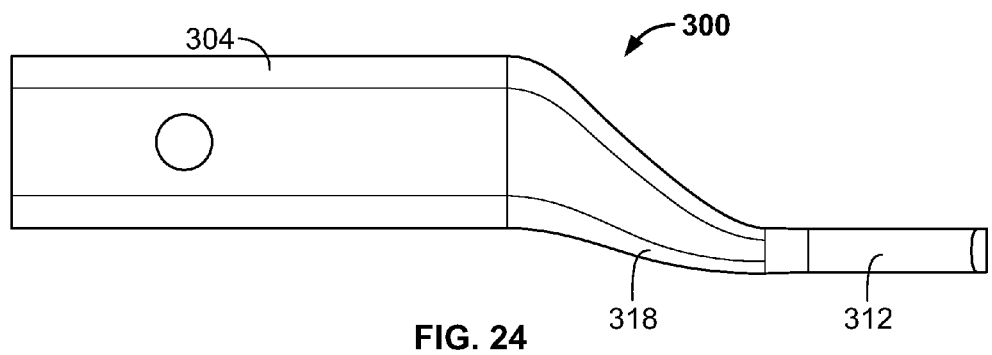
FIG. 24
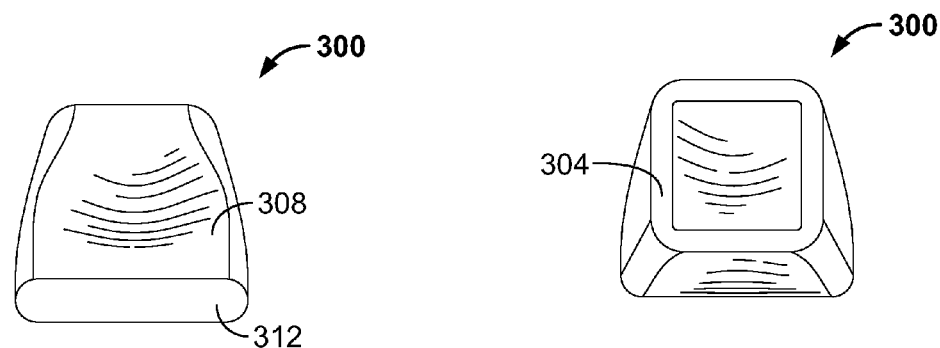
FIG. 25
FIG. 26
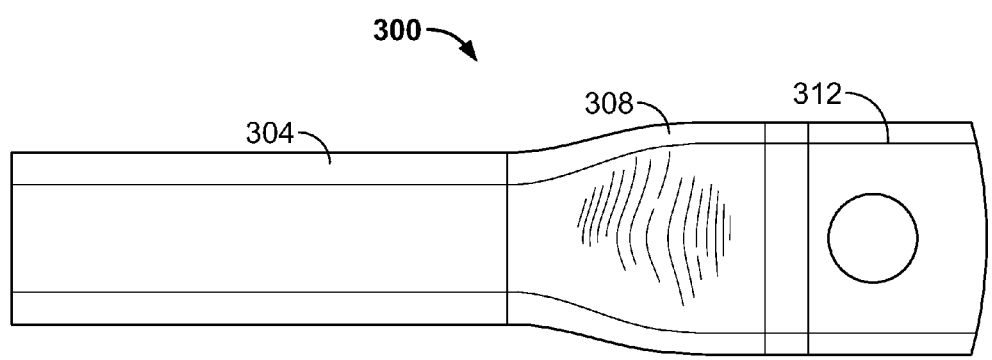
FIG. 27

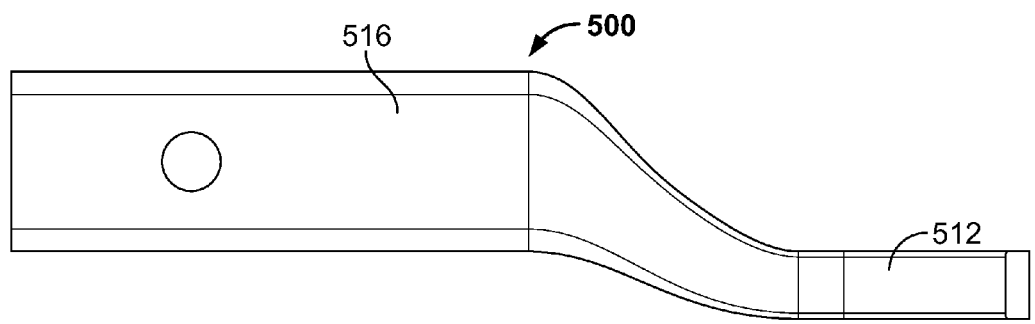
FIG. 36
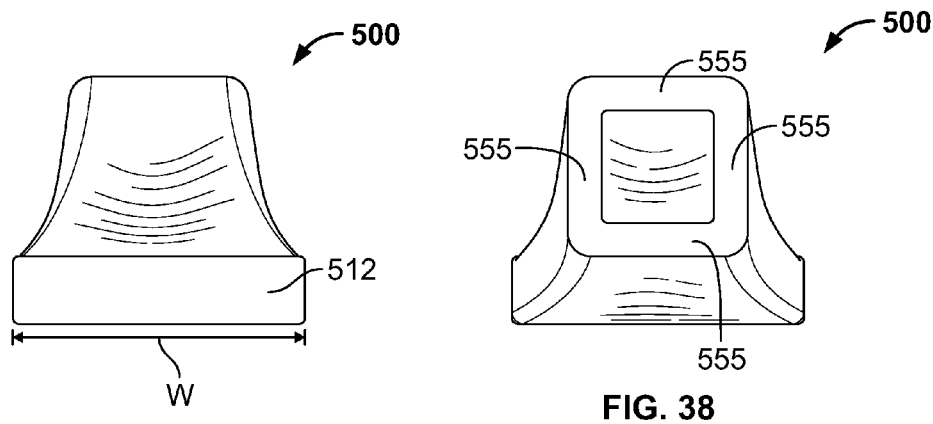
FIG. 37
FIG. 38
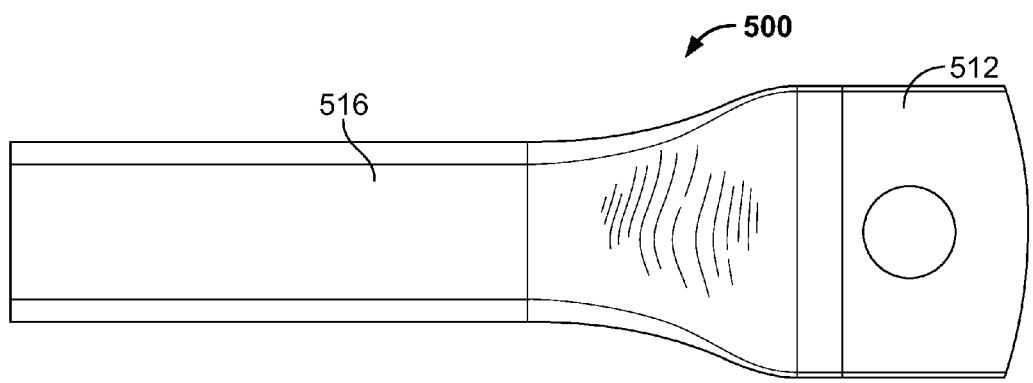
FIG. 39

HITCH BALL MOUNT AND METHOD OF FORMING THE HITCH BALL MOUNT

CROSS-REFERENCE TO RELATED APPLICATION

This application claims the benefit from U.S. Provisional Patent Application No. 61/545,878 entitled "Stamped Hitch Ball Mount" filed on Oct. 11, 2011, which is hereby incorporated in its entirety by reference.

FIELD OF THE INVENTION

The present invention is generally related to a hitch ball mount and, more particularly, to a stamped hitch ball mount and method of forming a hitch ball mount.

BACKGROUND

There are many different kinds of towing systems that are capable of securing a towed vehicle to a towing vehicle. Many of these systems attach in proximity to the rear of the towing vehicle. This results in the towed vehicle being secured to and extending from the rear of such towing vehicle. A common type of rear extending towing system is a trailer hitch receiver that may be attached to the frame of a towing vehicle. The trailer hitch receiver may utilize a cross bar or torsion tube that expands at least a portion of the length of the width of the vehicle and may be secured to the frame of the towing vehicle.

The trailer hitch receiver may include a receiver assembly that is secured to the cross bar, typically by welding such to the cross bar, but it is not limited to such. The receiver assembly may include a receiver tube, which may be of any appropriate shape and size. A hitch ball mount and hitch ball may then be selectively secured to the receiver tube. The hitch ball may be utilized to secure the towed vehicle to the towing vehicle.

It is often desirable to remove the hitch ball from the trailer hitch receiver, particularly when a towed vehicle is not being towed by the towing vehicle. In this situation, it may be desirable to not have the hitch ball extending from the rear of the towing vehicle. Accordingly, it may be desirable to remove the hitch ball from the trailer hitch receiver.

Accordingly, a trailer hitch ball mount is often utilized to selectively attach the hitch ball to the trailer receiver hitch. The trailer hitch ball mount may be capable of being secured to and removed from the trailer hitch receiver. This may result in the trailer hitch ball mount being carried and manipulated by a user when he or she desires to attach or remove the hitch ball. This may allow for the use of multiple hitch balls with different size hitch balls mounted thereon.

During use of the trailer hitch ball mount, however, significant forces are applied. This may result in the trailer hitch ball mount being heavy and difficult for a user to manipulate. For example, some trailer hitch ball mounts are manufactured from a solid forged piece of metal, which is particularly heavy, especially those having a class IV/V rating, or those that may be capable of towing 7000 pound or more. Given that trailer hitch ball mounts are manipulated by users to be secured and removed from the trailer hitch receiver, it is desirable for a hitch ball mount to be of a lighter construction while maintaining its class rating or weight capacity.

Moreover, the traditional hitch ball mount must go through several different steps in manufacturing, which may result in a higher cost to manufacture. For example, the hitch ball mount may be manufactured by welding a pre-formed tongue to a tube or solid bar/rod member. For example, a class I/II/III rated hitch ball mount or a hitch ball mount that may be capable of towing 5000 pounds or less may use a hollow tube welded to a solid thick steel tongue. The additional processing required to weld the components together adds to the time and costs to manufacture the hitch ball mount. It is desirable for the hitch ball mount to be easier and/or more cost effective to manufacture.

SUMMARY

A hitch ball mount is shown and described. The hitch ball mount may include a generally tubular body having first and second end portions, the first end portion engageable with a hitch receiver of a towing vehicle, and a drop portion monolithic with the tubular body and formed between the first and second end portions of the tubular member. The hitch ball mount may further include a hitch ball mounting portion monolithic with the drop portion and tubular body, the hitch ball mounting portion formed at the second end portion of the tubular member and extending from the drop portion, where a hitch ball is selectively attachable to the hitch ball mounting portion.

A hitch ball mount capable of securing a hitch ball to a hitch receiver of a towing vehicle may include a generally tubular body having first and second end portions and a cavity therebetween, the first end portion being engageable with the hitch receiver, and a drop portion monolithic with the tubular body and formed between the first and second end portions of the tubular member. The hitch ball mount may also include a hitch ball mounting portion monolithic with the drop portion and tubular body, the hitch ball mounting formed at the second end portion of the tubular member and extending from the drop portion, where hitch ball mounting portion is generally free of the cavity.

A hitch ball mount capable of securing a hitch ball to a hitch receiver may include a generally tubular body having first and second end portions, the first end portion engageable with a hitch receiver of a towing vehicle, and a drop portion monolithic with the tubular body and formed between the first and second end portions of the tubular member. The hitch ball mount may also include a hitch ball mounting portion formed with and attached to the drop portion free of welding between the hitch ball mounting portion and the drop portion.

A hitch ball mount capable of securing a hitch ball to a hitch receiver may include a monolithic tubular member. The monolithic tubular member may include a first section having a cavity extending a longitudinal length and a second section extending from the first section. The monolithic tubular member may also include a third section extending from the second section, the third section being generally flattened and generally free of the cavity, where the hitch ball is capable of being secured to the third section.

BRIEF DESCRIPTION OF THE DRAWINGS

Operation of the invention may be better understood by reference to the following detailed description taken in connection with the following illustrations, wherein:

FIG. 24 is a side view of the hitch ball mount of FIG. 22.

FIG. 25 is a front view of the hitch ball mount of FIG. 22.

FIG. 26 is a rear view of the hitch ball mount of FIG. 22.

FIG. 27 is top view of the hitch ball mount of FIG. 22.

FIG. 36 is a side view of the hitch ball mount of FIG. 34.

FIG. 37 is a front view of the hitch ball mount of FIG. 34.

FIG. 38 is a rear view of the hitch ball mount of FIG. 34.

FIG. 39 is top view of the hitch ball mount of FIG. 34.

DETAILED DESCRIPTION

Figure 1:
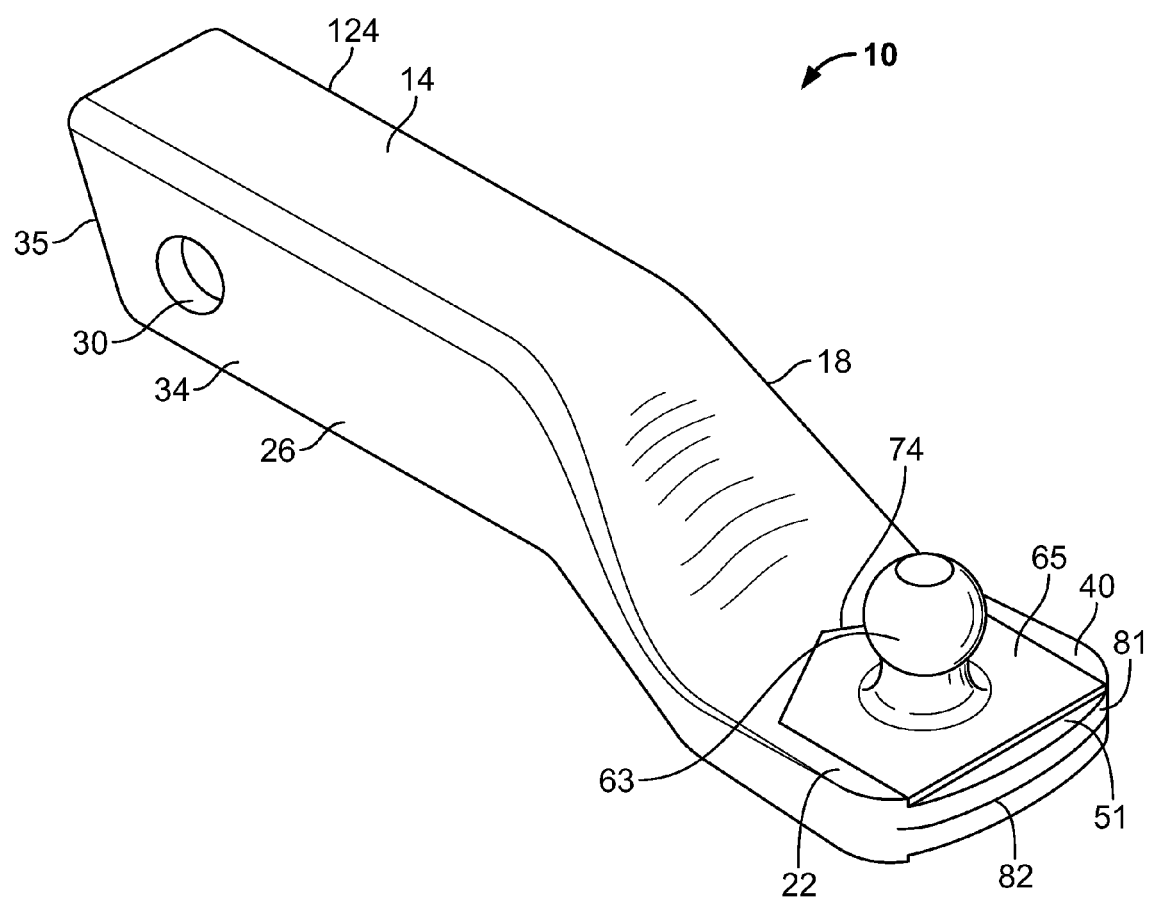
FIG. 1 is a perspective view of embodiments of a hitch ball mount.
Figure 1A:
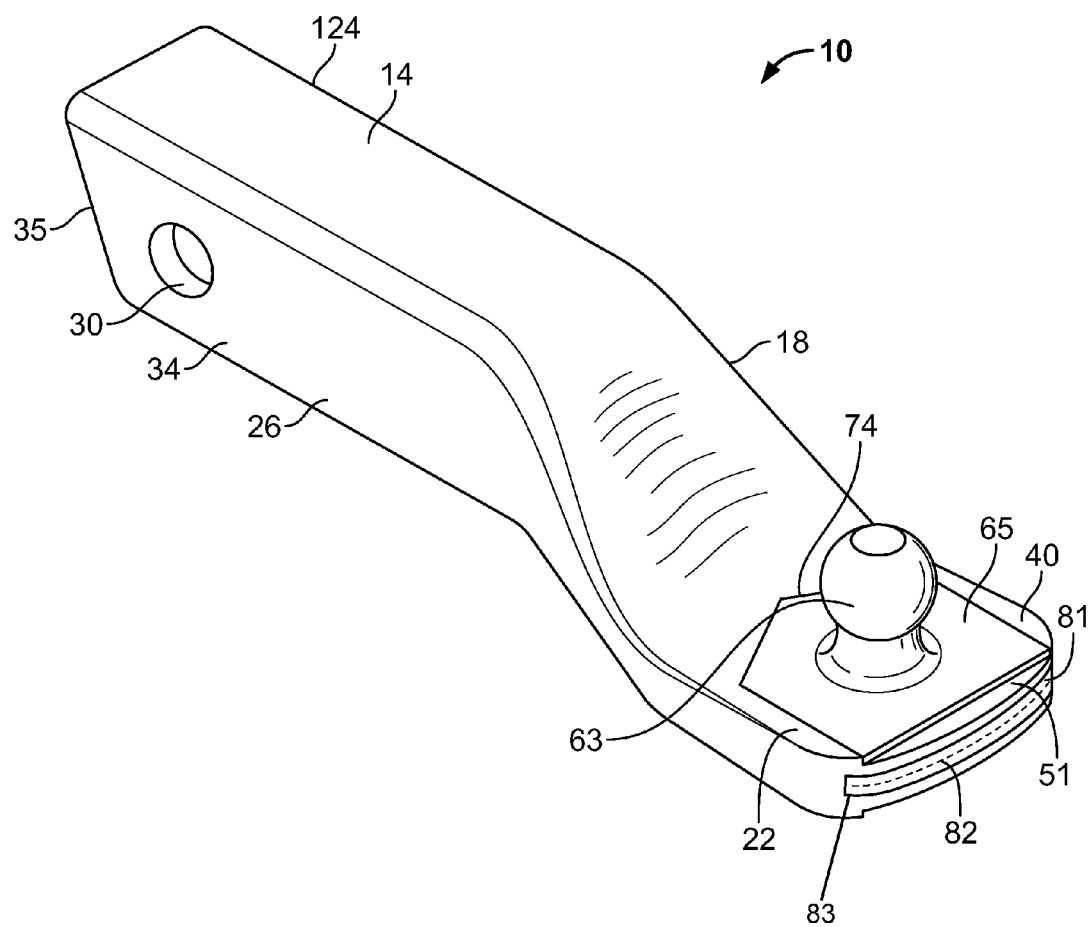
FIG. 1A is a perspective view of embodiments of a hitch ball mount and FIG. 1B is a perspective view of a hitch ball mount attached with a towing vehicle.
Figure 1B:
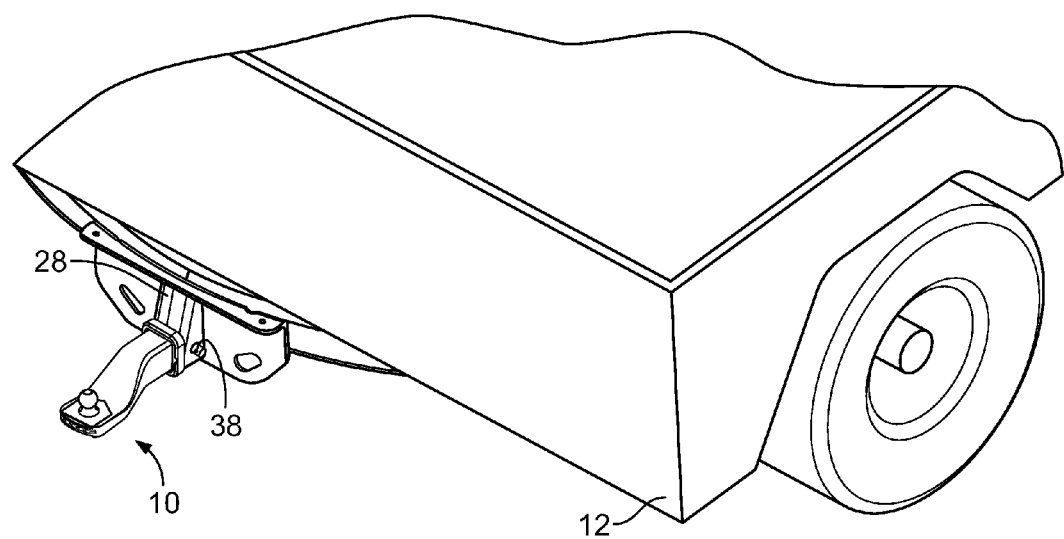

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A hitch ball mount 10 may be utilized to operatively secure a towing vehicle 12 with a towed vehicle in any appropriate manner. The hitch ball mount 10 may be formed as a monolithic unit or otherwise may be integrally formed. The hitch ball mount 10 may include a hitch receiver attachment portion 14, a drop portion 18 and a hitch ball mount portion or tongue 22, as shown in FIGS. 1-6. The hitch receiver attachment portion 14 may include a tubular portion 26. The tubular portion 26 may be of any appropriate shape such that it may be capable of operatively engaging a hitch receiver 28 in any appropriate manner. By way of a non-limiting example, the tubular portion 26 may be of a generally square, rectangular, oval, circular shape or any combination of such shapes. The tubular portion 26 may include an aperture, or by way of a non-limiting example a pair of transverse apertures 30 that are located on at least two sides 34 of the tubular portion 26. The tubular portion 26 may further include a generally angled end portion 35. The angled end portion 35 may make it easier to load the tubular portion 26 into mating engagement with the applicable hitch receiver 28.

The apertures 30 may be shaped and sized such that when the hitch receiver attachment portion 14 selectively engages the trailer hitch receiver 28, the trailer hitch receiver may include correspondingly shaped and sized apertures whereby a pin, a lock, or the like 38 may pass through the apertures 30 to selectively secure the hitch receiver portion 14 to the trailer hitch receiver (not shown).

Figure 2:
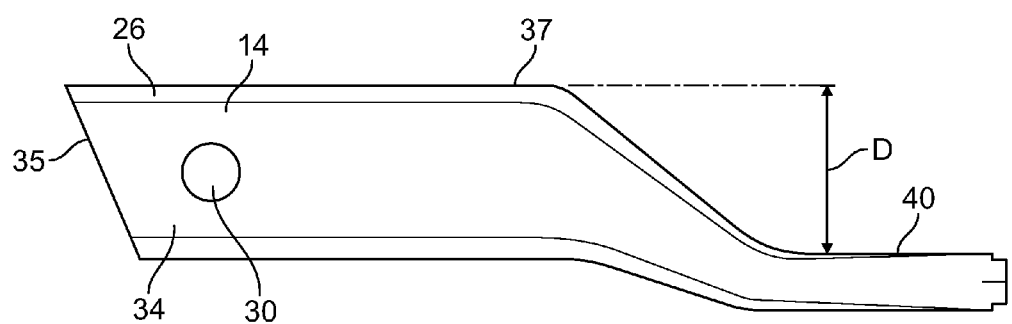
FIG. 2 is a side view of the hitch ball mount of FIG. 1.
Figure 3:
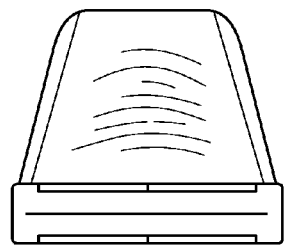
FIG. 3 is a front view of the hitch ball mount of FIG. 1.
Figure 4:
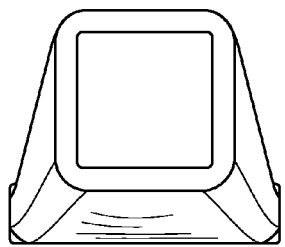
FIG. 4 is a rear view of the hitch ball mount of FIG. 1.
Figure 5:
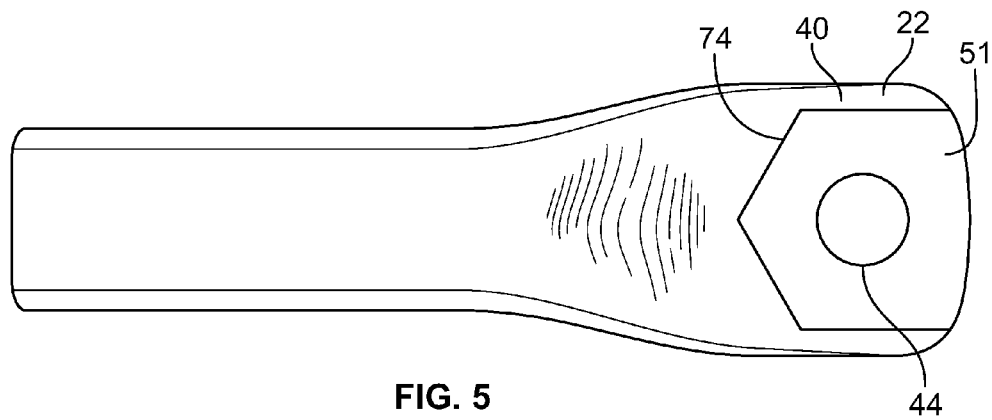
FIG. 5 is a top view of the hitch ball mount of FIG. 1.
Figure 6:
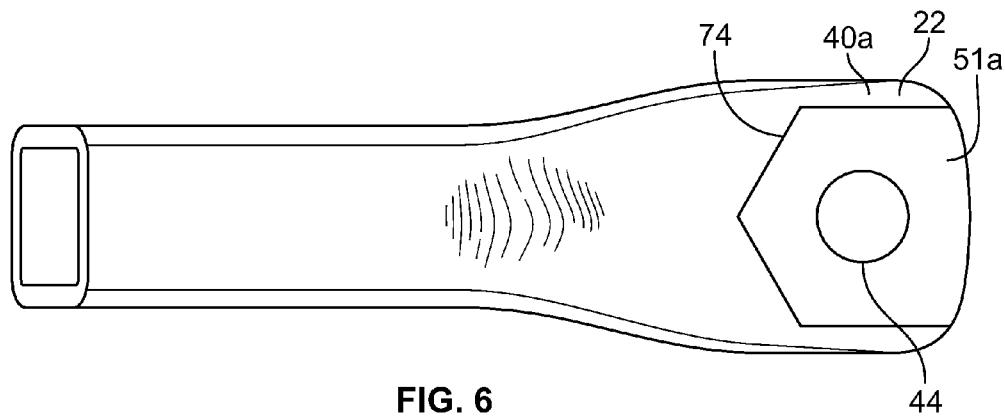
FIG. 6 is a bottom view of the hitch ball mount of FIG. 1.

The drop portion 18 of the hitch ball mount 10 may extend generally between the hitch receiver attachment portion 14 and the tongue 22. The drop portion 18 may be of any appropriate distance D as measured vertically from an upper surface 37 of the receiver portion 14 to an upper surface 40 of the tongue 22, an example of which is shown in FIG. 2. In some embodiments, the drop portion 18 may be a zero drop whereby the drop portion 18, the upper surface 37 of the receiver attachment portion 14 and the tongue 22 may be generally parallel with each other. The appropriate distance D of the drop portion 18 may be based upon the distance the tongue 22 may be desired to extend from the upper surface 37 of the hitch receiver attachment portion 14 to account for the use of the hitch ball mount 10.

The tongue 22 may extend from the drop portion 18. The tongue 22 may include a hitch ball aperture 44 positioned on the upper surface 40 of the tongue 22 and may extend through the tongue 22. The hitch ball aperture 44 may be shaped and sized to receive a hitch ball 46 with nut 47 that may be selectively engaged with the tongue 22 in any appropriate manner. Further, the tongue 22 may include a first recess 51 generally circumscribing the hitch ball aperture 44 in an upper surface 40 of the tongue 22. Alternatively or in addition, a second recess 51a may be provided around the hitch ball aperture 44 in a second face 44a of the tongue 22. The first and second recesses 51, 51a may have a generally non-circular shape. By way of a non-limiting example, the first and second recesses 51, 51a may assume an oval, polygonal, square, rectangular, hexagonal, and star shape, or a combination thereof. The first and second recesses 51, 51a may be of a generally identical shape or may possess different shapes.

Figure 7:
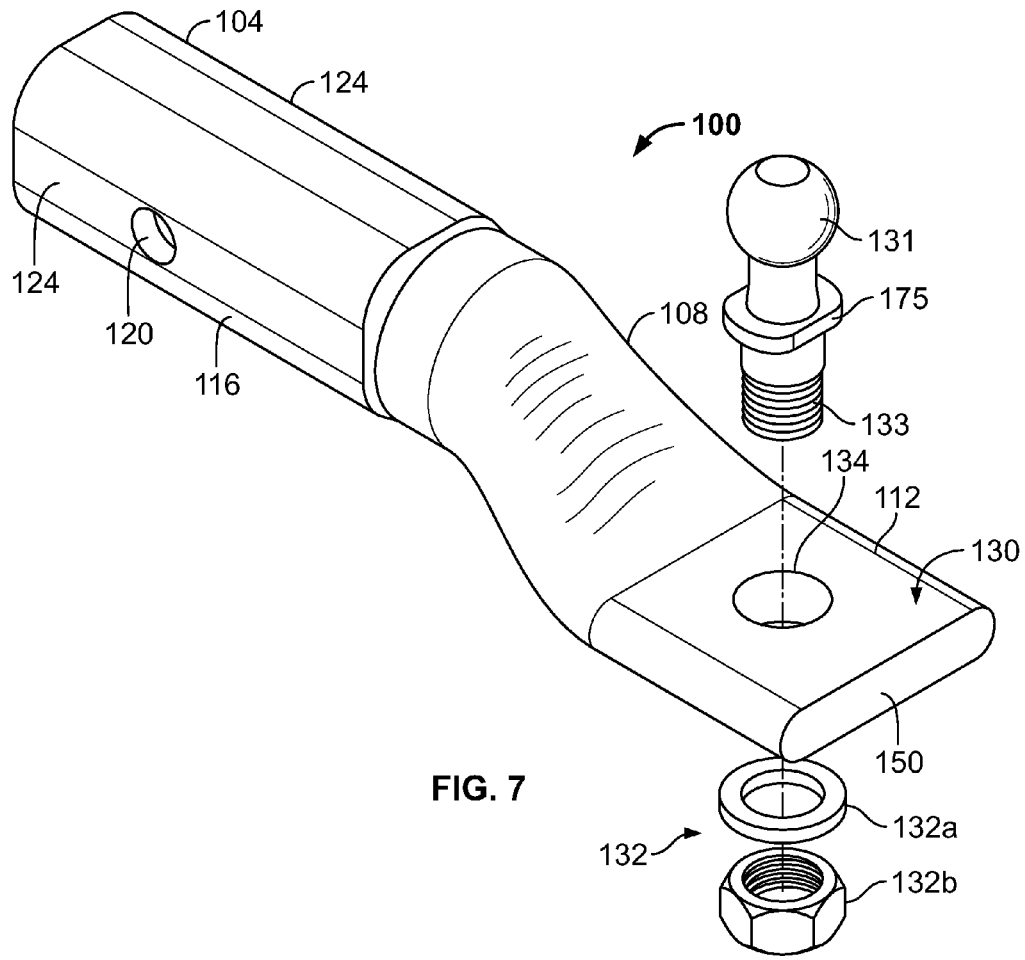
FIG. 7 is a front perspective view of embodiments of a hitch ball mount.
Figure 8:
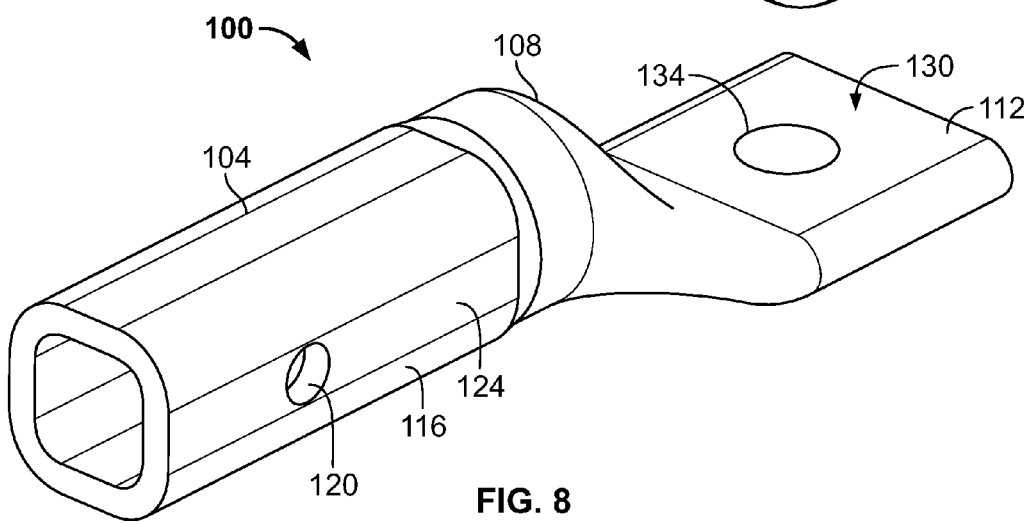
FIG. 8 is a rear perspective view of the hitch ball mount of FIG. 7.

In such embodiments, a hitch ball 63, an example of which is shown in FIG. 1, having a base 65 and threaded mounting shank 133 (such as shown in FIG. 7) may be capable of being selectively secured in the hitch ball aperture 44. The base 65 may be correspondingly sized and shaped to be received and held in at least one of the first and second recesses 51, 51a. The base 65 may fit in and generally fill the first or second recess 51, 51a or may fit in and fill only a portion of the first or second recess 51, 51a.

A fastener 132 (such as that shown in FIG. 7) may be provided for engaging the mounting shank 133 and securing the hitch ball 63 to the hitch ball mount 10, such as by way of a non-limiting example, the fastener 132 may be a nut 132b and a lock washer 132a. Alternatively, a self-locking nut may be utilized.

The hitch ball 63 may be easily and conveniently connected to the hitch ball mount 10. The mounting shank 133 of the hitch ball 63 may be aligned with and pushed through the hitch ball aperture 44 in the tongue 22. As this is done the base 65 of the hitch ball 63 may be seated in the recess 51, or the second recess 51a, as applicable. Once seated, a sidewall 74 of the recess 51 may engage a side or sides of the base 65 so as to effectively prevent the hitch ball 63 from rotating relative to the hitch ball mount 10. The lock washer 132a may be placed over the mounting shank 133 and the nut 132b may then be tightened on that mounting shank 133 to complete the connection. During the tightening process, the engagement of the base 65 of the hitch ball 63 with the sidewall 74 of the recess 51 may prevent rotation of the hitch ball 63 in the hitch ball mount 10. This may, therefore, allow connection with a single tool.

Figure 14:
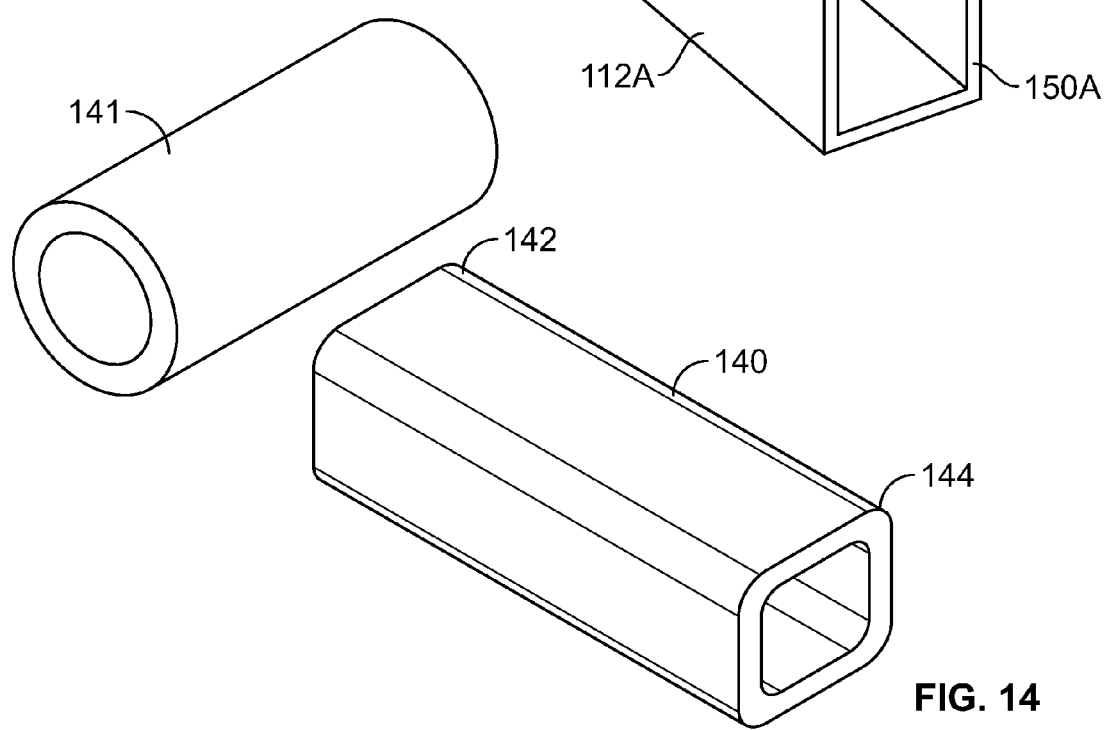
FIG. 14 is a perspective view of a tubular member and an alternative embodiment of a tubular member.

The hitch ball mount 10 may be integrally formed from a single tubular member. By way of a non-limiting example, the hitch ball mount 10 may be formed from a generally hollow tubular member 140, an exemplary embodiment of which is shown in FIG. 14. The hitch ball mount 10 may be forged, stamped or hydro-formed. In some embodiments, a thinner wall hollow tubular member may be used to create a one piece class I, II, or III (lighter duty) hitch ball mount 10 and in some embodiments a thicker walled hollow tubular member may be used to create a one-piece class IV or V (or heavy duty) hitch ball mount 10.

By way of a non-limiting example, the hitch ball mount 10 may be formed from a tubular member 140 such as the generally square cross-section tubular member shown in FIG. 14. The tubular member 140, however, is not limited to being a generally square cross-section as shown. The tubular member 140 may be of any appropriate shape, such as for example, the tubular member 140 may be generally rectangular, circular, oval, triangular, hexagonal, or any other polygonal shape. The tubular member 140 may have walls of any appropriate thickness which may depend upon the class of the hitch ball mount (e.g., a higher class or more heavy duty rated hitch ball mount may be made formed from a tubular member having thicker walls than a lower class rated or lighter duty hitch ball mount).

The tubular member 140 may be of any appropriate length. By way of a non-limiting example, the tubular member 140 may be approximately 24 inches in length. Although, any appropriate length tubular member 140 may be used. A longer tubular member may be used when a longer drop configuration D is to be formed. A tube of any length, however, may be used to form the applicable tubular member 140. The tube may be cut to length by any appropriate means, such as for example by utilizing a saw that may cut the tube to length. Alternatively, the tubular member 140 may be formed having the appropriate length and may not need to be cut to length. The tubular member 140 may be of any appropriate material, such as steel by way of a non-limiting example. Further, the tubular member 140 may be cut to include the generally angled end portion 35 as described above. The generally angled end portion 35 may be formed by utilizing a saw to cut the end thereof.

The tubular member 140 may be stamped or otherwise formed so as to form the hitch ball mount 10. The hitch ball mount 10 may therefore be a single monolithic unit whereby no additional components may need to be added or otherwise attached. This may result in the hitch receiver portion 14, drop portion 18 and tongue 22 being a monolithic unit or a single integral piece whereby no other items may need to be attached thereto. The hitch ball mount 10 may be formed in any appropriate manner. By way of a non-limiting example, the hitch ball mount 10 may be formed utilizing the tubular member 140 and stamping, cold forming or hydro-forming.

In some embodiments, a tubular member 141 may be generally circular in cross-section as shown in FIG. 14. In these embodiments, the receiver attachment portion 14 may be stamped in the appropriate shape. By way of a non-limiting example, an appropriate portion of the generally circular cross-sectional tubular member 141 may be stamped to form a generally rectangular or square cross-sectional receiver attachment portion 14 that may be capable of operatively engaging the hitch receiver 28. In these embodiments, the receiver attachment portion 14 may be stamped on all four sides at once so as to form the generally rectangular or square cross-sectional shape. Further, in these embodiments, the drop portion 18 and tongue 22 may be formed through subsequent operation.

In some embodiments, the tubular member 140 may be hardened by any appropriate manner, which may strengthen the metal used to form the hitch ball mount 10. This hardening may occur before forming the hitch ball mount 10, after forming the hitch ball mount 10, or both before and after forming the hitch ball mount 10. By way of a non-limiting example, the tubular member 140 may be work hardened by any appropriate manner before forming the hitch ball mount 10, after forming the hitch ball mount 10, or both before and after forming the hitch ball mount 10. Further yet, the hitch ball mount 10 may be annealed to change the material properties such before processing further, after formation or both.

Once the tubular member 140 is hardened or if it is not to be hardened until after formation or not hardened at all, the tubular member 140 may be placed in a die 145 of appropriate shape and size. The shape and size of the die 145 may depend upon the size and shape of the hitch ball mount 10 required. In the die 145, the tubular member 140 may be stamped by the appropriate process and machinery. The present teachings are not limited to a specific stamping process; any suitable stamping process may be used.

Figure 67:
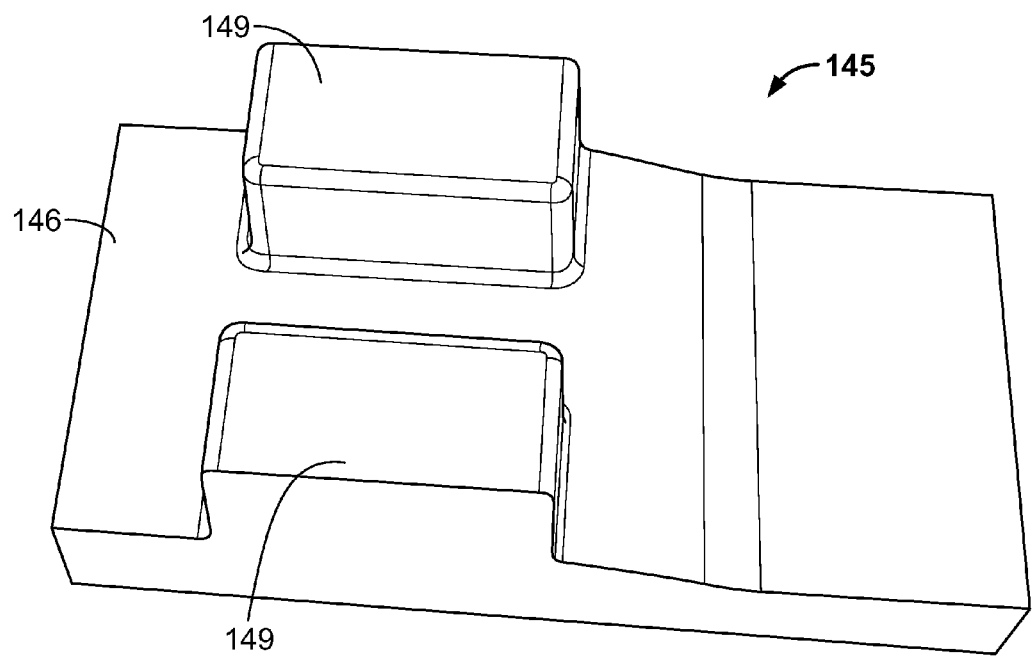
FIG. 67 is a perspective view of embodiments of a portion of a die for forming a hitch ball mount.
Figure 68:
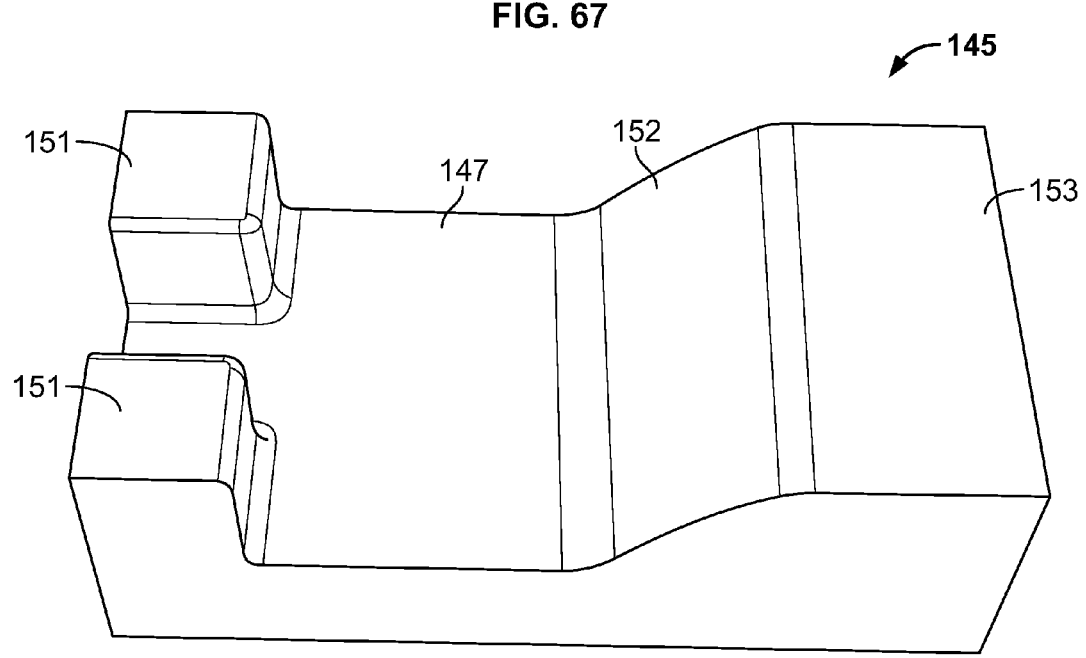
FIG. 68 is a perspective view of embodiments of a portion of a die for forming a hitch ball mount.

An exemplary embodiment of the die 145 is shown in FIGS. 67-68. In these embodiments, the die 145 may include a bottom die 146, shown in FIG. 67 and a top die 147 shown in FIG. 68. The bottom die 146 may include a pair of upstanding members 149 that may hold a portion of the tubular member 140 in the appropriate position when placed in the die 145. The top die 147 may include a pair of upstanding members 151, a sloped portion 152, and a generally planar portion 153. The upstanding members 151 may hold a portion of the tubular member 140 in the appropriate position when the top die 147 engaged the bottom die 146, similar to the upstanding members 149. Further, the sloped portion 152 may form the drop portion 108 and the generally planar portion 153 may form the tongue 22.

In operation of the die 145, the tubular member 140 may be placed in the die 145 whereby a portion of the tubular member 140 is held in place by the upstanding members 149 of the bottom die 146. The top die 147 may then travel toward the bottom die 146 so that the top die 147 may engage the tubular member 140. In engaging the tubular member 140, the upstanding members 149 of the bottom die 146 and the upstanding members 150 of the top die 147 may generally hold the tubular member 140 in the appropriate location. The generally planar portion 153 may engage the tubular member 140 generally forming the tongue 22 and the sloped portion 152 may engage the tubular member 140 generally forming the drop portion 18. The shape and size of the die 145 may change based upon the desired shape and attributes of the hitch ball mount 10 required. By way of a non-limiting example, the slope of the sloped portion 152 of the top die 147 may be increased or decreased depending upon the required distance D of the drop portion 18.

Upon stamping of the tubular member 140, the drop portion 18 may be formed. The stamp may engage the tubular member 140 between its first end and second end portions 142, 144 to form the drop portion 18. During this process, however, the first end portion 142 of the tubular member 140 may not be stamped such that it forms the hitch receiver portion 14. In some embodiments, the apertures 30 on the hitch receiver portion 14 may be formed in advance by any suitable process, such as by way of a non-limiting example, stamping, drilling or the like. In some embodiments, the apertures 30 may be formed after the hitch ball mount 10 is formed. Further in some embodiments, the apertures 30 may be formed generally simultaneously with the formation of the drop portion 18, the tongue 22, or the hitch ball aperture 44.

The stamped tubular member 140 with the drop portion 18 formed may be placed in another die. This combination may then be stamped, which may form a portion of the tongue 22 or alternatively, may form the entire tongue 22. If only a portion of the tongue 22 is formed, the stamped combination may be placed in yet another die to complete the formation of the tongue 22 or may remain in the same die to form the remainder of the tongue 22. Alternatively, the stamped tubular member 140 with the drop portion 18 may remain in the die used to form such and the combination may be further stamped which may form a portion of the tongue 22 or alternatively, may form the entire tongue 22. If only a portion of the tongue 22 is formed, the stamped combination may be placed in another die to complete the formation of the tongue 22 or may remain in the same die to form the remainder of the tongue 22.

In some embodiments, the hitch ball aperture 44 may be formed by placing the hitch ball mount 10 having had the drop portion 18 and tongue 22 formed into another die and stamping the tongue 22, which may form the hitch ball mounting aperture 44. In other embodiments, the hitch ball aperture 44 may be formed simultaneously with the stamping of the tongue 22. In the alternative, the hitch ball aperture 44 may be formed by another process, such as by way of a non-limiting example, it may be drilled or the like.

In some embodiments, the tubular member 140 may be placed in a single die. In this die, the tubular member 140 may be stamped to form the drop portion 18. The combination may be stamped again to form at least a portion of the tongue 22, or may form the entire tongue 22 during the initial stamping process. If the tongue 22 is not completely formed, the combination may be stamped again to form the remainder of the tongue 22. This combination may be stamped to form the hitch ball aperture 44, or alternatively, the hitch ball aperture 44 may be formed with the tongue 22 during any of the stamping steps.

In some embodiments, the tubular member 140 may be placed in an appropriate die and the tubular member 140 be stamped once to form the entire hitch ball mount 10, including the drop portion 18, the tongue 22 and the hitch ball aperture 44. This may result in the hitch ball mount 10 being formed in a single step. Alternatively, the hitch ball mount 10 may be formed in progressive processes, but where the hitch ball mount 10 remains in a single die.

Further, the hitch ball mount 10 may be formed through cold forming. The tubular member 140 may be placed in the appropriate die without any heating of the tubular member 140 or die. The die may stamp the tubular member 140 on one side using a dwell press, for example, the stamp presses on the tubular member 140 within the die and pressure from the press remains applied to the tubular member 140 forming the hitch ball mount 10. The tubular member 140 may then be removed from the die, turned over (or the die may just be turned over) and the other side of the tubular member 140 may be pressed using the dwell press process. The dwell press may generally eliminate or at least reduce seams that may otherwise be present. This is especially useful for any seam that may form on the tongue 22.

In some embodiments, the hitch ball mount 10 may be formed from a piece of hollow tube approximately 2" (50.8 mm) square with a wall thickness of approximately 0.24" (6 mm), this may be particularly suited for a class III draw bar. This tubular member 140 may be placed in a die and formed (with or without the application of heat) into the hitch ball mount 10 with a prearranged amount of drop configuration D. This drop configuration D can be all most negligible to a maximum limited by the tooling.

The hitch ball mount 10 being formed through stamping may eliminate weld stresses that may otherwise be present with the prior art hitch ball mounts as it may not be necessary to weld any additional components to the hitch ball mount 10. Additionally, forming the hitch ball mount 10 as described above may allow control of stress paths of the hitch ball mount 10 such that they may flow through the entire hitch ball mount 10 instead of occurring at the welds as may occur with the prior art hitch ball mounts.

While finishing operations may not be necessary for the hitch ball mount 10, certain finishing operations may be desired for purely aesthetical reasons. In some embodiments, an end portion 81 of the tongue 22 may undergo a finishing operation, such as by way of a non-limiting example welding the end portion 81 to make it aesthetically pleasing. In addition or alternatively, the end portion 81 may be ground down or ground smooth to clean the end portion 81 or to shape the end portion 81 to a desired shape. The welding and grinding operations, however, may not be necessary. By way of a non-limiting example, the end portion 81 of the tongue 22 may undergo a non-structural weld to generally improve the aesthetic appearance of the end portion 81. The end portion 81 may include a seam 82, which may be the result of the stamping process described above. The seam 82 may have added thereto a protective layer 83, such as adding a non-structural weld thereon. This may provide a generally smooth finish to the end portion 81 and may generally reduce or eliminate the seam 82.

Further still, the end portion 81 may be resisted welded, which may generally eliminate the seam 82. After being stamped as described above, the seam 82 on the end portion 81 may undergo resistance welding, which may generally eliminate or reduce the seam 82. This may further hold together the seam 82, which may also generally protect interior components of the hitch ball mount 10 from the environment. This may generally prevent premature degradation of the materials of the hitch ball mount 10.

Figure 13:
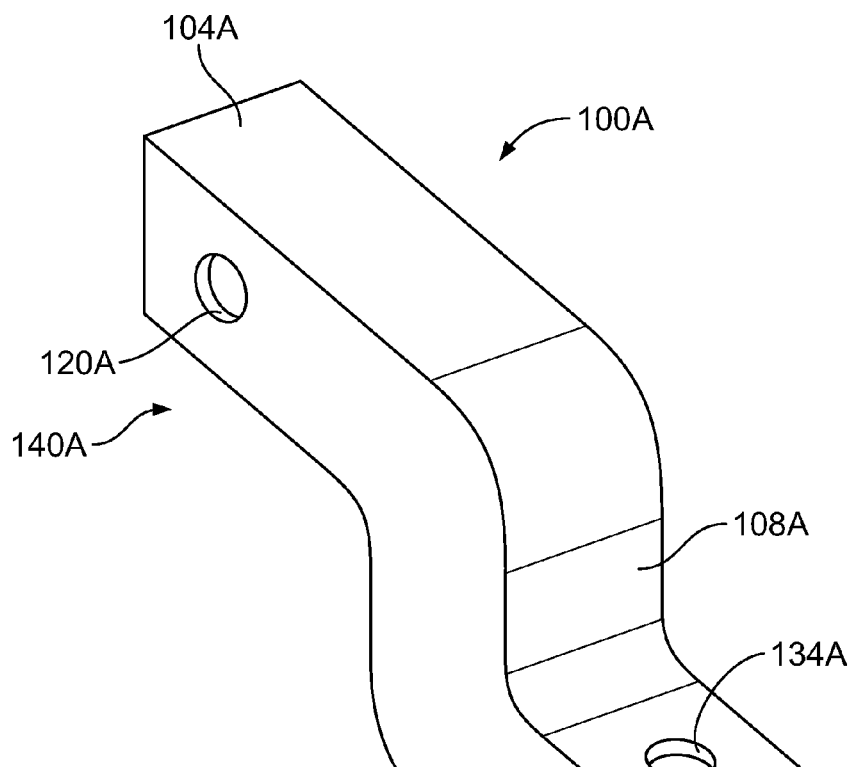
FIG. 13 is a perspective view of embodiments of a hitch ball mount.

In some embodiments, the tubular member 140A may be bent into a generally lazy S-formation as shown in FIG. 13 before stamping. Any appropriate method may be used to bend the tubular member 140A, such as by way of a non-limiting example, cold forming or mandrel bending the tubular member 104A. While a generally S-shape is shown, the present teachings are not limited to this shape. Any appropriate shape may be used. The generally S-shape may form the hitch receiver portion 14, the drop portion 18 and the tongue 22 once stamped. By way of a non-limiting example, a top of the bent generally S-shaped tubular member 140 may form the hitch receiver portion 14, a middle portion of the generally S-shaped bent tubular member 140 may form the drop portion 18 and a bottom of the generally S-shaped bent tubular member 140 may form the tongue 22. Once the tubular member 140A is bent, it may be stamped as indicated above. In some embodiments, while cold-forming and/or prior to cold-forming the tubular member 140A may be heated slightly to reduce work hardening. The cold-forming may work harden the tubular member 140A.

Figure 15:
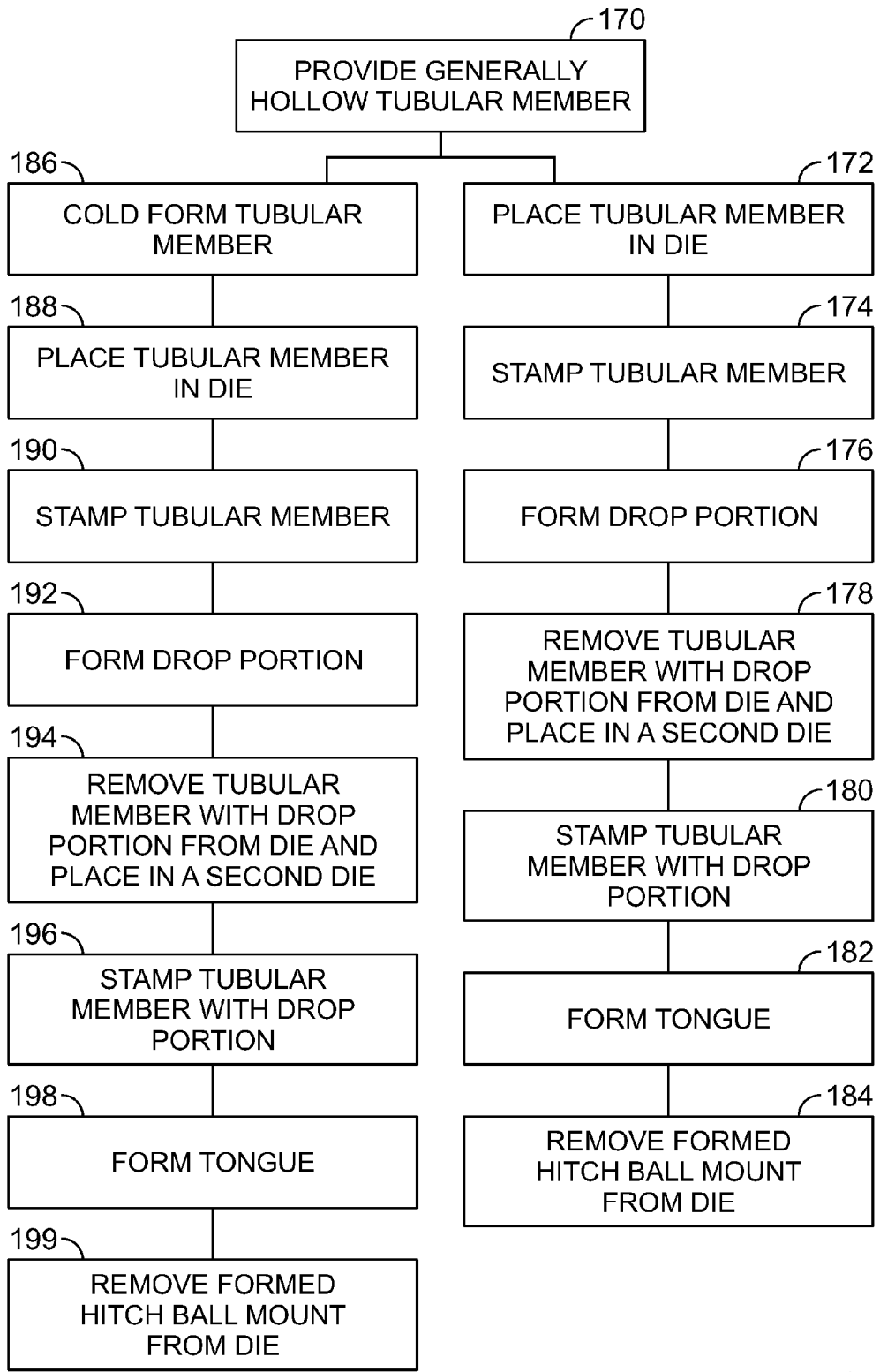
FIG. 15 is a diagrammatical view of exemplary embodiments of steps of forming a hitch ball mount.
Figure 16:
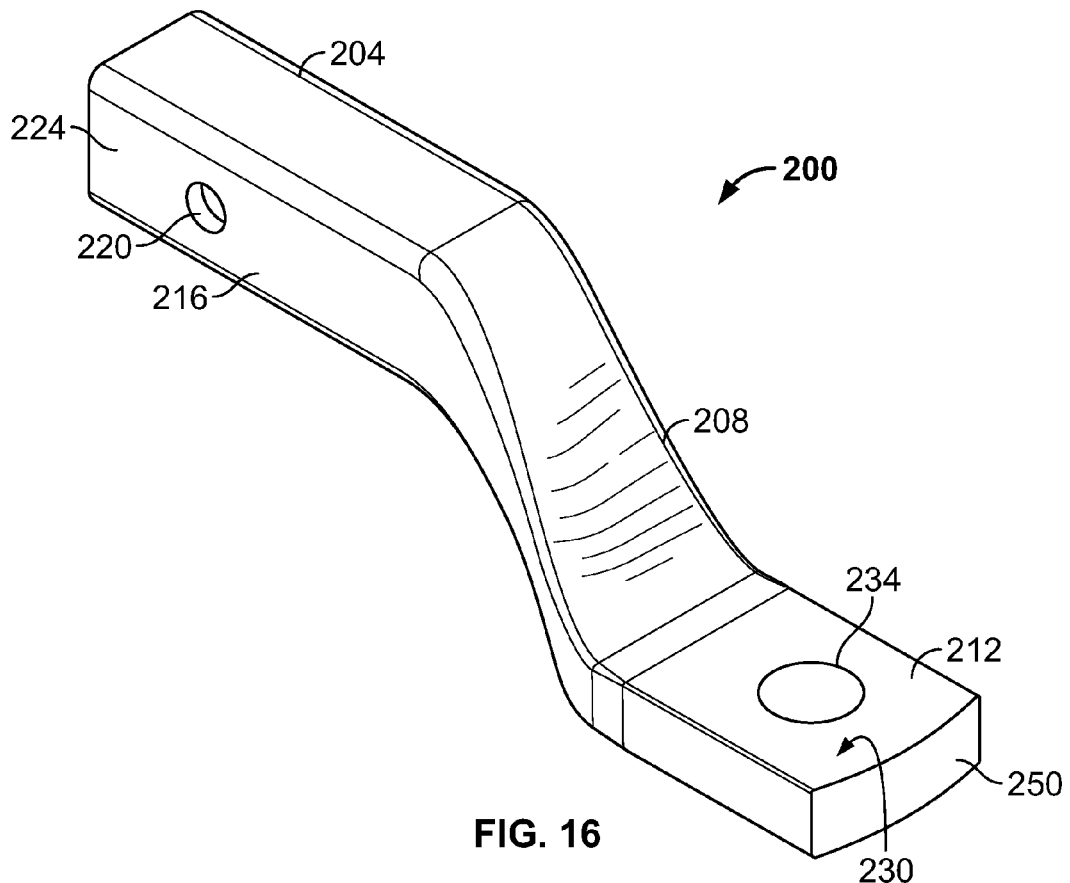
FIG. 16 is a front perspective view of embodiments of a hitch ball mount.
Figure 17:
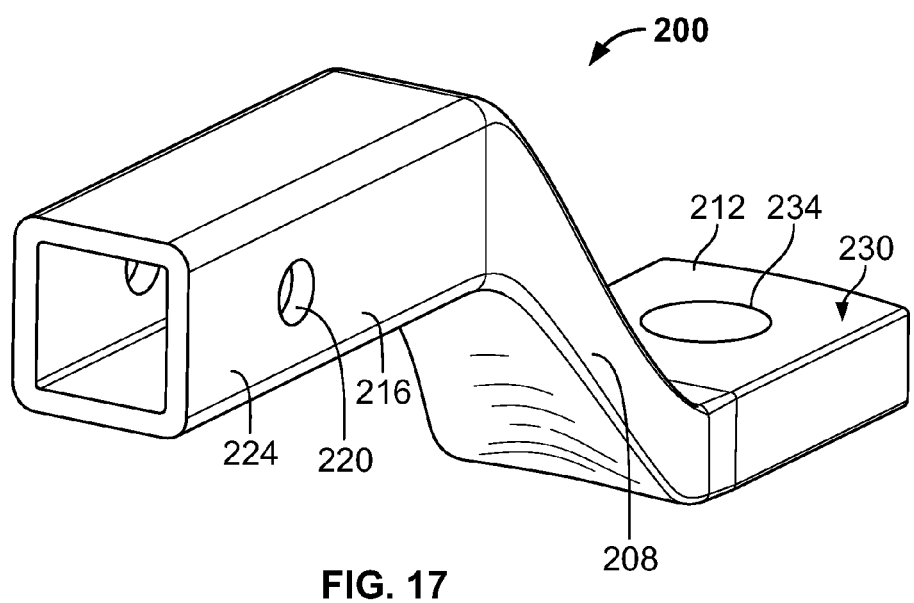
FIG. 17 is a rear perspective view of the hitch ball mount of FIG. 16.
Figure 18:
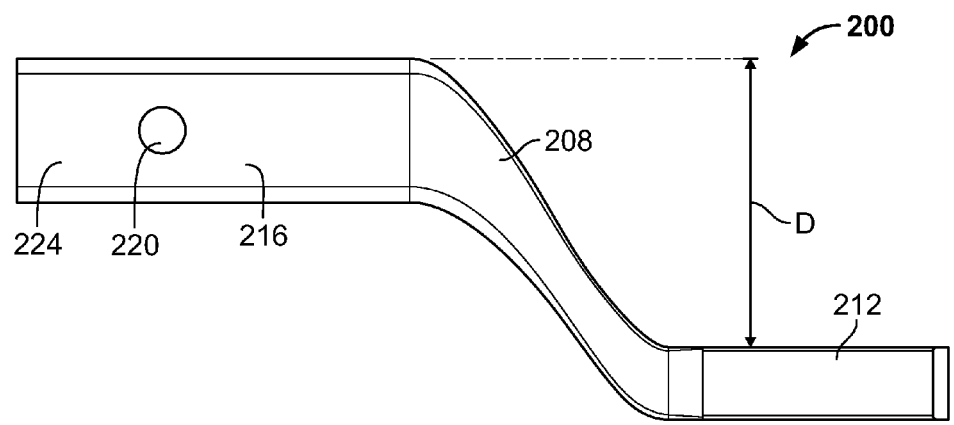
FIG. 18 is a side view of the hitch ball mount of FIG. 16.
Figure 19:
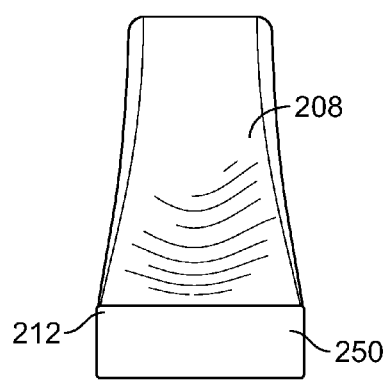
FIG. 19 is a front view of the hitch ball mount of FIG. 16.
Figure 20:
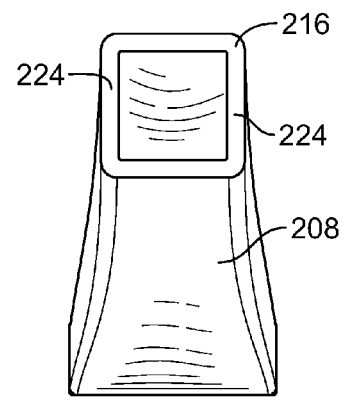
FIG. 20 is a rear view of the hitch ball mount of FIG. 16.
Figure 21:
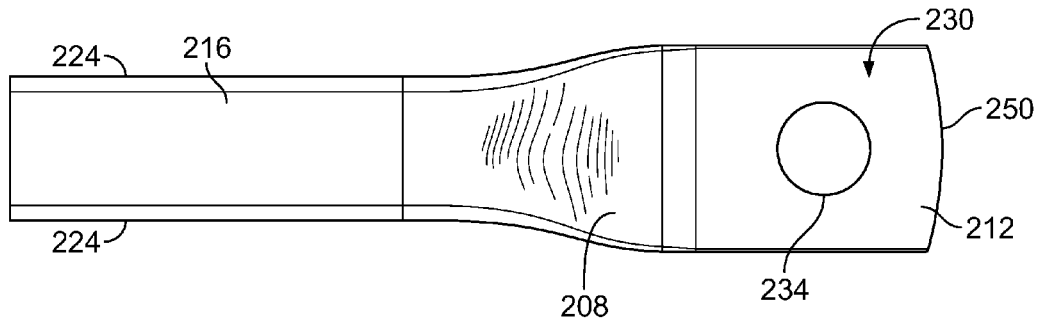
FIG. 21 is top view of the hitch ball mount of FIG. 16.
Figure 22:
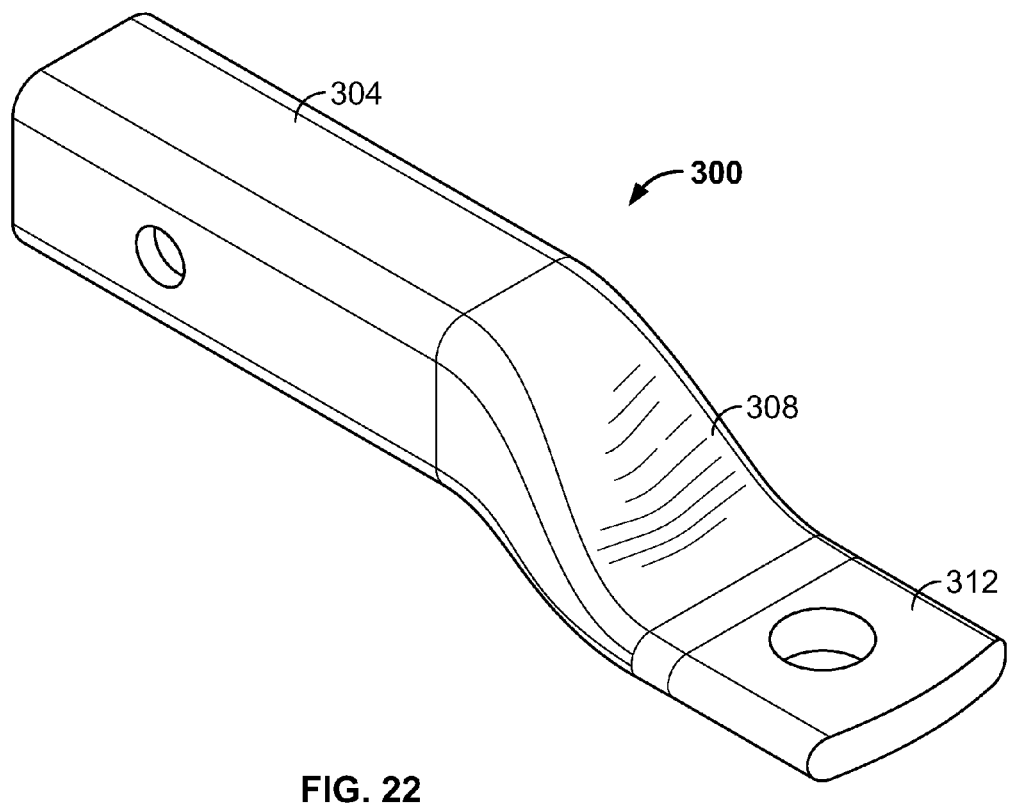
FIG. 22 is a front perspective view of embodiments of a hitch ball mount.
Figure 23:
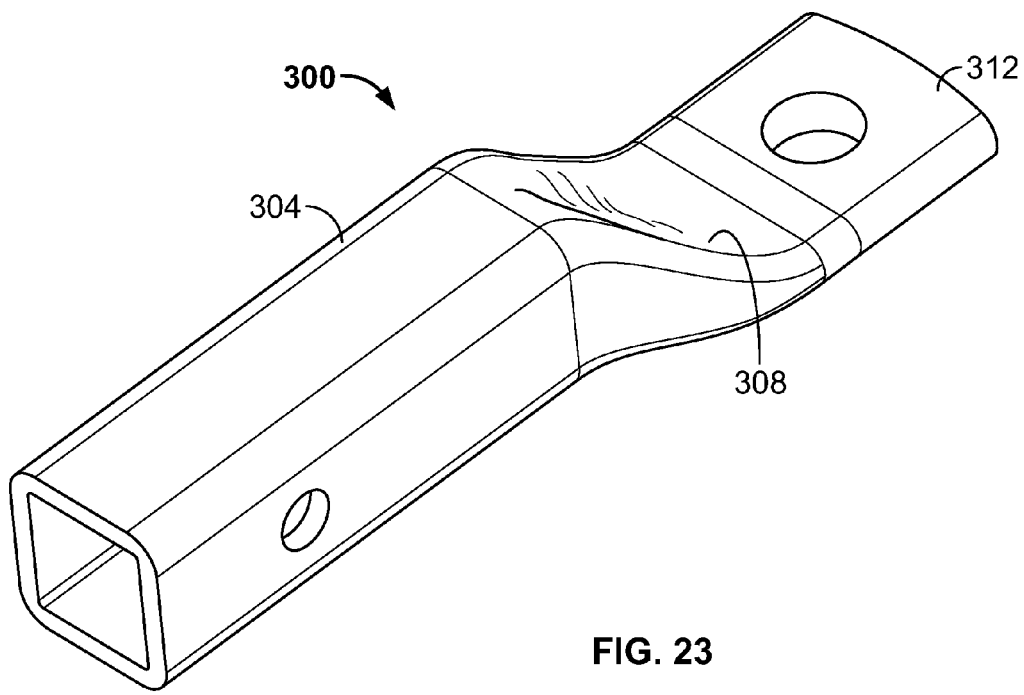
FIG. 23 is a rear perspective view of the hitch ball mount of FIG. 22.
Figure 28:
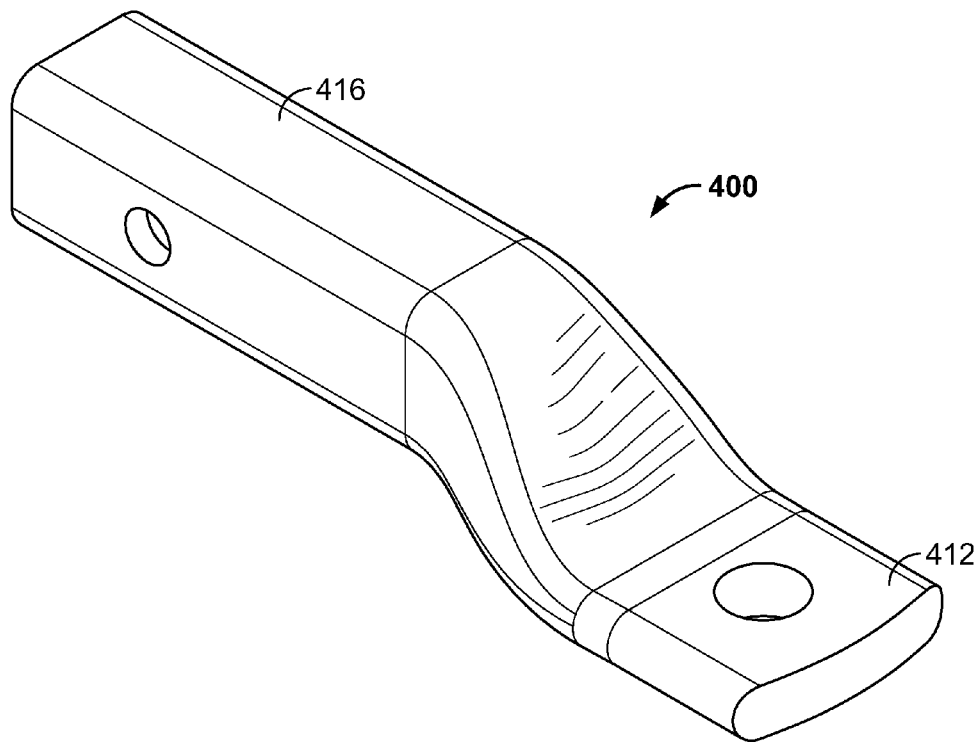
FIG. 28 is a front perspective view of embodiments of hitch ball mount.
Figure 29:
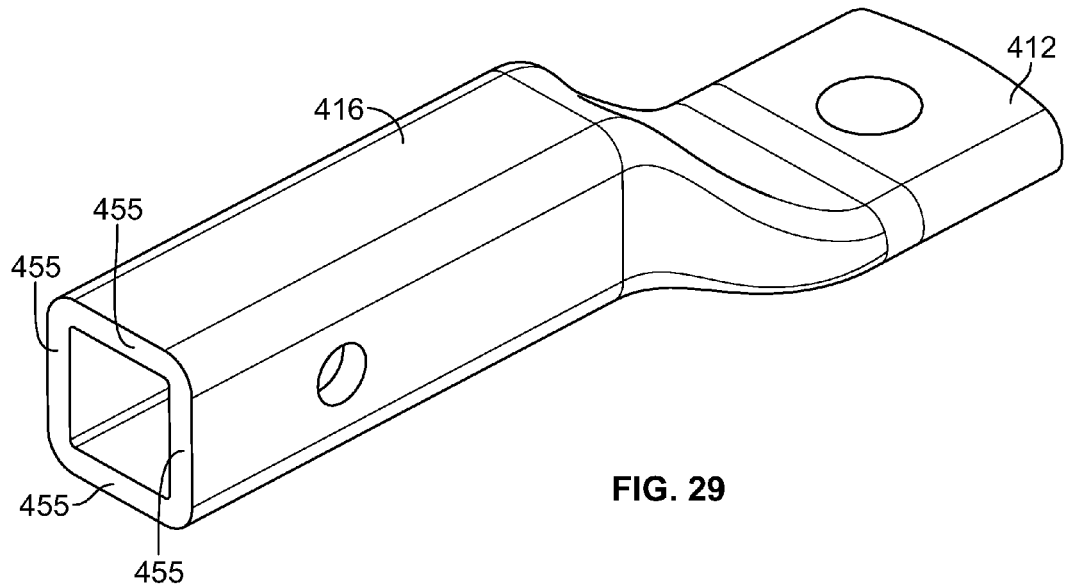
FIG. 29 is a rear perspective view of the hitch ball mount of FIG. 28.
Figure 30:
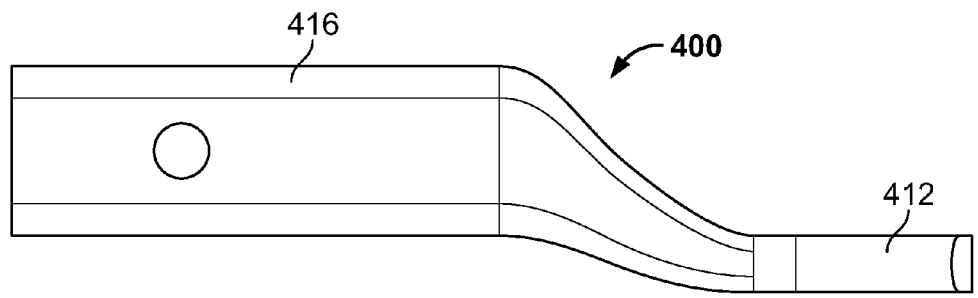
FIG. 30 is a side view of the hitch ball mount of FIG. 28.
Figure 31:
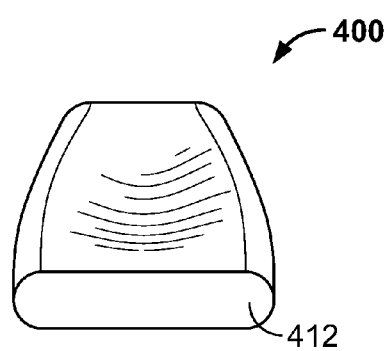
FIG. 31 is a front view of the hitch ball mount of FIG. 28.
Figure 32:
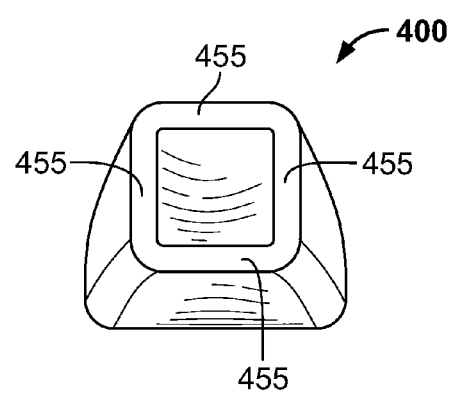
FIG. 32 is a rear view of the tamped hitch ball mount of FIG. 28.
Figure 33:
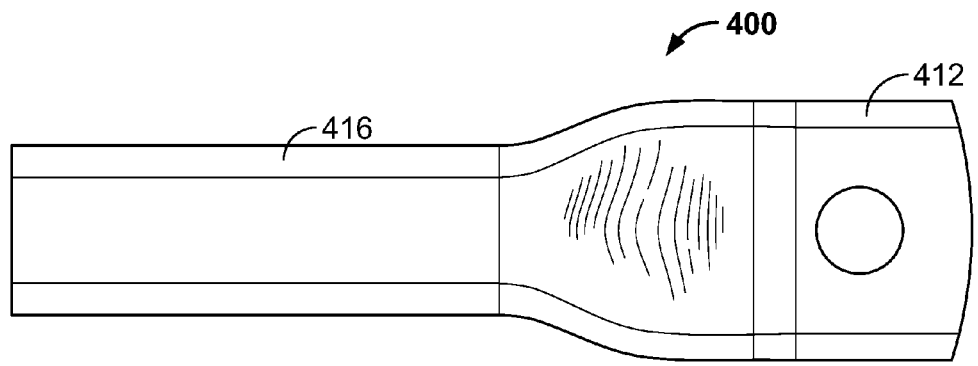
FIG. 33 is top view of the hitch ball mount of FIG. 28.
Figure 34:
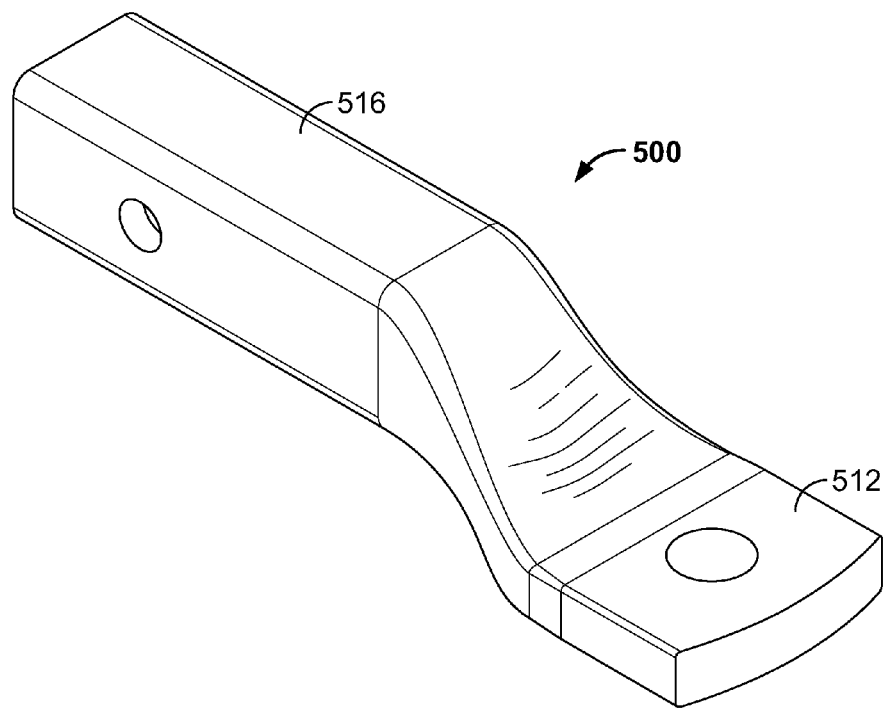
FIG. 34 is a front perspective view of embodiments of a hitch ball mount.
Figure 35:
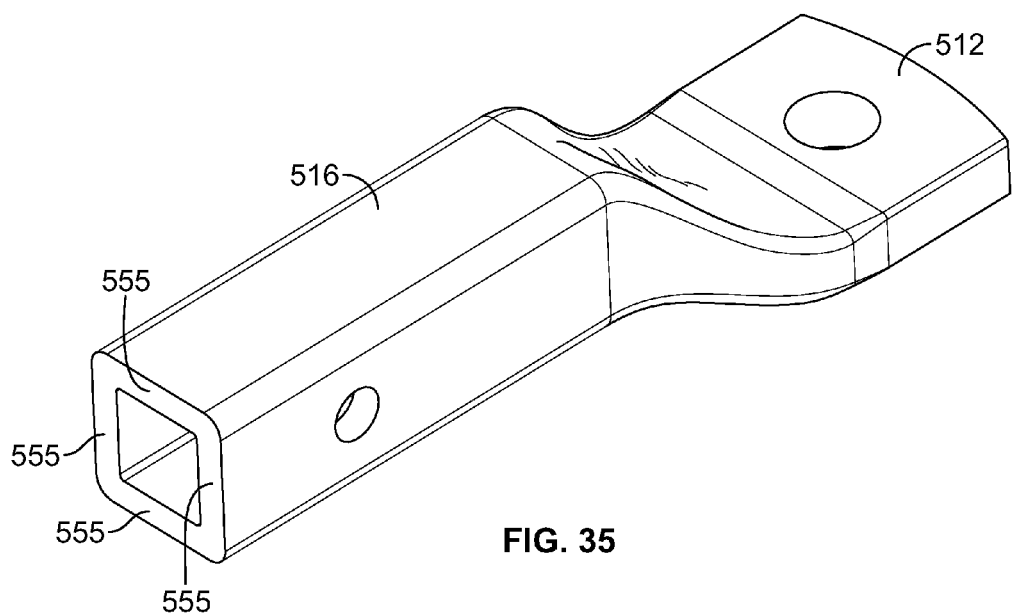
FIG. 35 is a rear perspective view of the hitch ball mount of FIG. 34.
Figure 40:
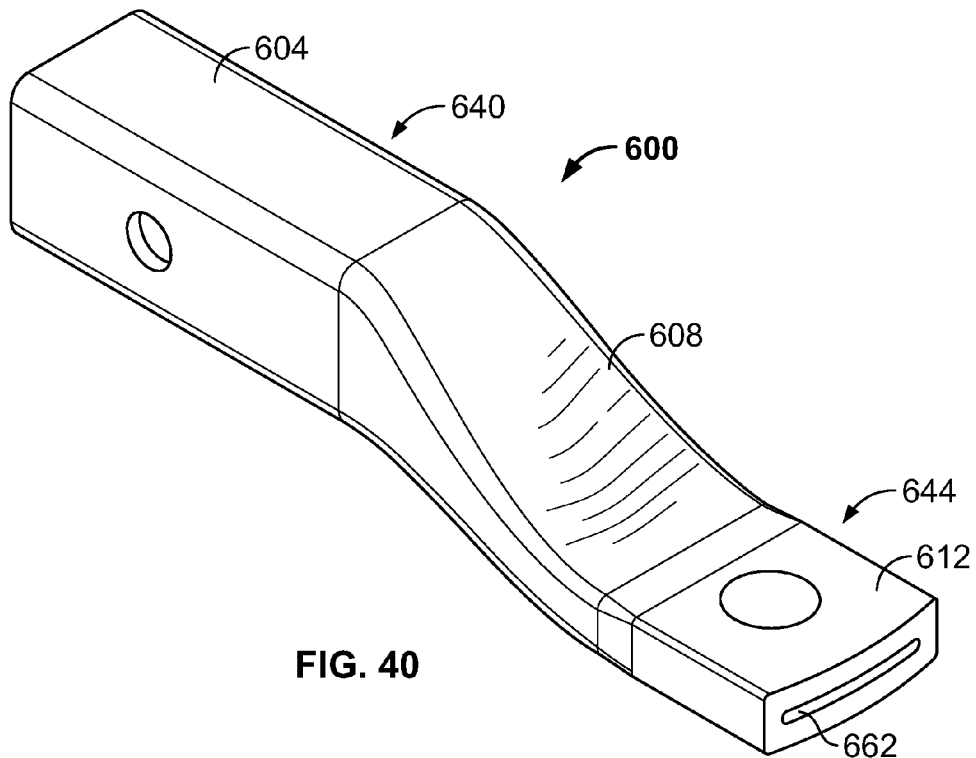
FIG. 40 is a front perspective view of embodiments of a hitch ball mount.
Figure 41:
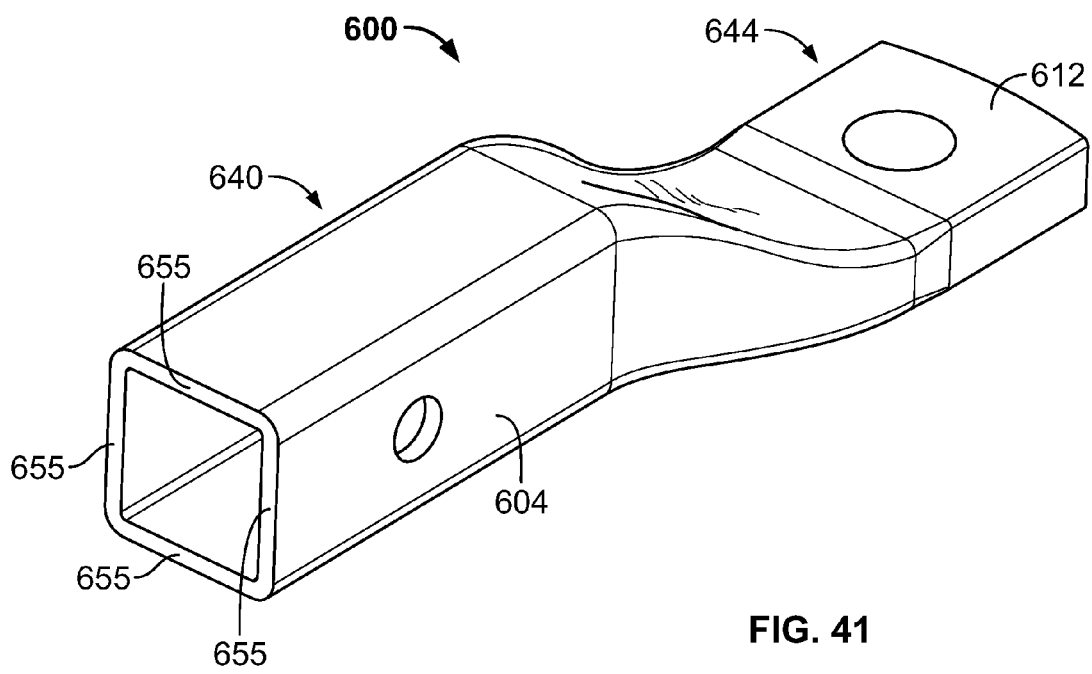
FIG. 41 is a rear perspective view of the hitch ball mount of FIG. 40.
Figure 42:
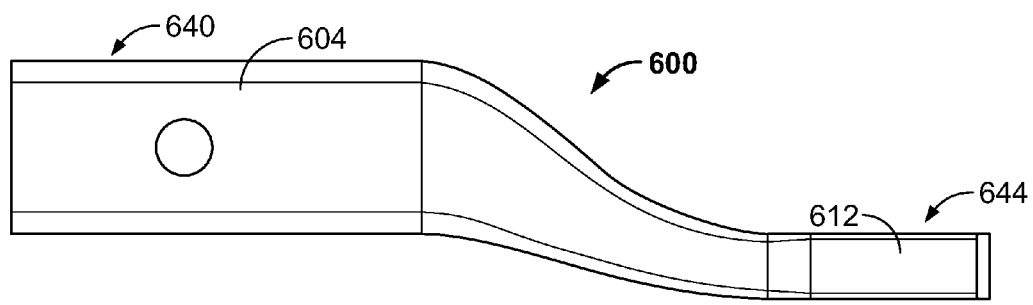
FIG. 42 is a side view of the hitch ball mount of FIG. 40.
Figure 43:
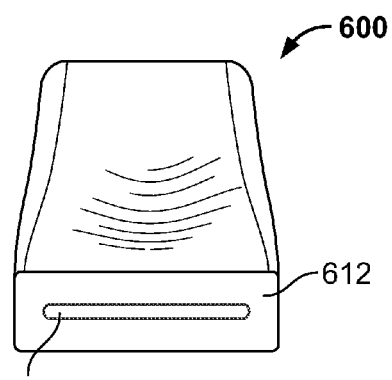
FIG. 43 is a front view of the hitch ball mount of FIG. 40.
Figure 44:
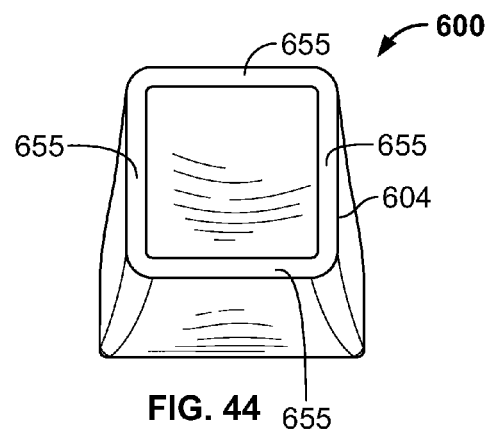
FIG. 44 is a rear view of the hitch ball mount of FIG. 40.
Figure 45:
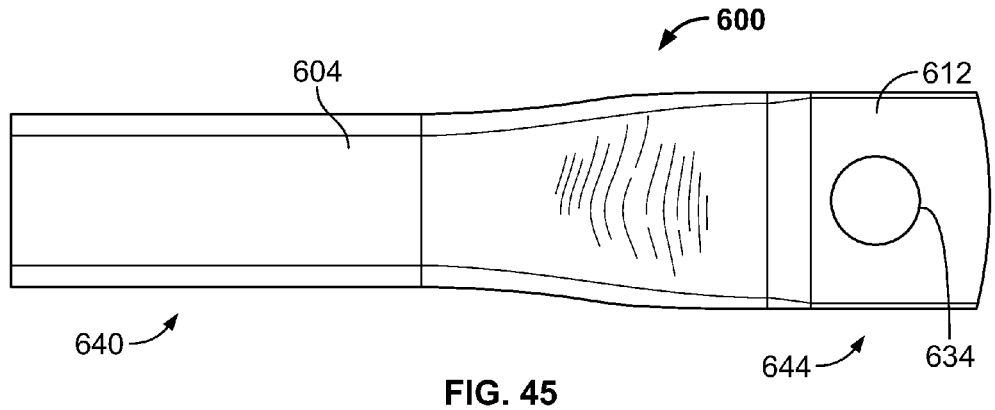
FIG. 45 is top view of the hitch ball mount of FIG. 40.

Some exemplary methods for forming the hitch ball mount 10 are shown in FIG. 15. As shown in step 170, the tubular member 140 may be provided. The tubular member 140 may be placed in a die, as shown in step 172. Next, the tubular member 140 may be stamped as shown in step 174—the stamping may dwell on the tubular member 140 to further form the hitch ball mount 10. Stamping the tubular member 140 may form the drop portion 18 as shown in step 176. The tubular member 140 may then be removed from the die and may be placed in a second die as shown in step 178. The tubular member 140 with drop portion 18 may then be stamped as shown in step 180—the stamping may dwell on the tubular member 140 to further form the tongue 22. This stamping may form the tongue 22 as shown in step 182. The formed hitch ball mount 10 may be removed from the die as shown in step 184.

Further, as shown in box 170 the tubular member 140 may be provided. The tubular member 140 may be cold formed as shown in step 186. The tubular member 140 may be placed in a die, as shown in step 188. Next, the tubular member 140 may be stamped as shown in step 190—the stamping may dwell on the tubular member 140 to further form the hitch ball mount 10. Stamping the tubular member 140 may form the drop portion 18 as shown in step 192. The tubular member 140 may then be removed from the die and may be placed in a second die as shown in step 194. The tubular member 140 with drop portion 18 may then be stamped as shown in step 196—the stamping may dwell on the tubular member 140 to further form the tongue 22. This stamping may form the tongue 22 as shown in step 198. The formed hitch ball mount 10 may be removed from the die as shown in step 199.

The description of the steps above may be accomplished in any order and certain steps may be skipped or additional steps added thereto. Moreover, the steps may be accomplished completely manually, automatically or by a combination of such. By way of a non-limiting example, a single machine may be used to cut the tube into the appropriate length to form the tubular member 140 and may possess the appropriate dies and stamping mechanism to form the remainder of the hitch ball mount 10.

Additional embodiments of a hitch ball mount according the present teachings are described below. In the descriptions, all of the details and components may not be fully described or shown. Rather, some of the features or components are described and, in some instances, differences with the above-described embodiment may be pointed out. Moreover, it should be appreciated that these additional embodiments may include elements or components utilized in the above-described embodiment although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired hitch ball mount without departing from the spirit and scope of the present teachings.

A hitch ball mount 100 may include a hitch receiver attachment portion 104, a drop portion 108 and a hitch ball mount portion or tongue 112 as shown in FIGS. 7-12. The hitch receiver attachment portion 104 may include a tubular portion 116. The tubular portion 116 may be of any appropriate shape such that it may be capable of engaging a trailer hitch receiver. By way of a non-limiting example, the tubular portion 116 may be generally square, rectangular, oval, circular shape or any combination of such shapes. The tubular portion 116 may include an aperture, or by way of a non-limiting example a pair of transverse apertures 120 that are located on at least two sides 124 of the tubular portion 116.

The apertures 120 may be shaped and sized such that when the hitch receiver attachment portion 104 selectively engages the trailer hitch receiver, the trailer hitch receiver may include correspondingly shaped and sized apertures. A pin, lock, or the like may pass through the apertures 120 to selectively secure the hitch receiver portion 104 to the trailer hitch receiver. Further, any appropriate method and apparatus may be used to selectively secure the hitch receiver portion 104 to the trailer hitch receiver.

Figure 9:
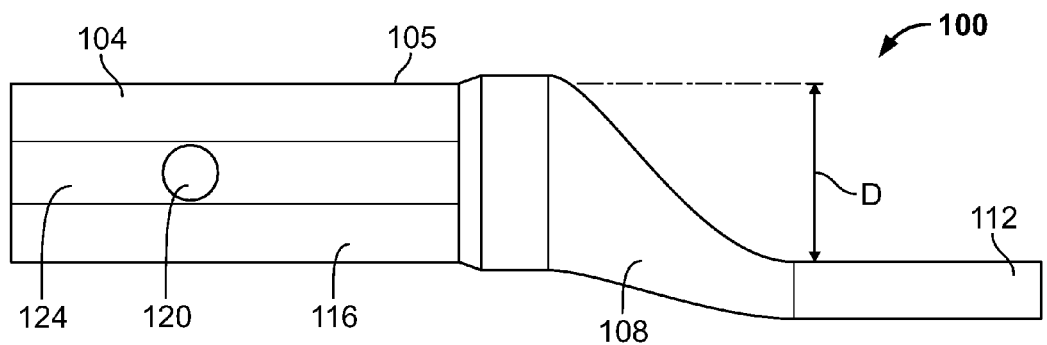
FIG. 9 is a side view of the hitch ball mount of FIG. 7.
Figure 10:
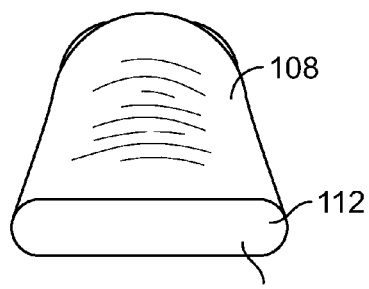
FIG. 10 is a front view of the hitch ball mount of FIG. 7.
Figure 11:
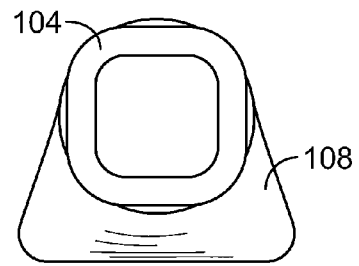
FIG. 11 is a rear view of the hitch ball mount of FIG. 7.
Figure 12:
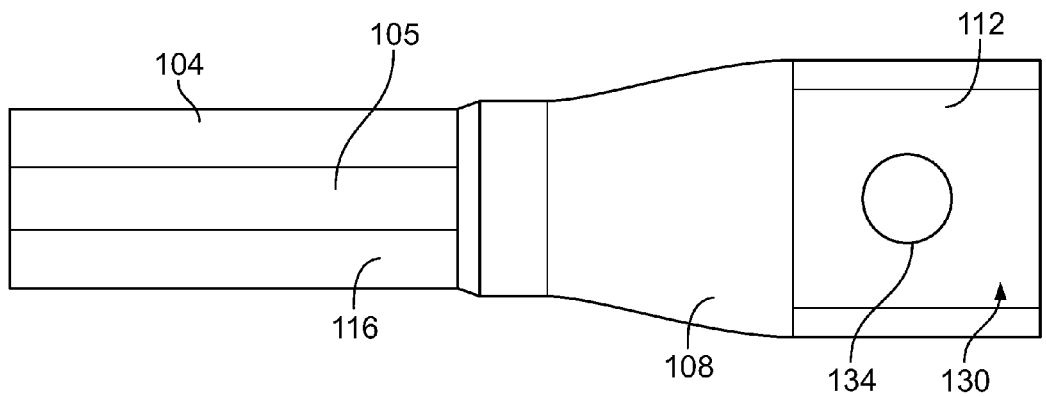
FIG. 12 is top view of hitch ball mount of FIG. 7.

The drop portion 108 of the hitch ball mount 100 may extend between the hitch receiver attachment portion 104 and the tongue 112. The drop portion 108 may be of any appropriate distance D as measured vertically from an upper surface 105 of the receiver portion 104 to an upper surface 130 of the tongue 112, an example of which is shown in FIG. 9. In some embodiments, the drop portion 108 may be a zero drop whereby the drop portion 108, the upper surface 105 of the receiver attachment portion 104 and the tongue 112 may be generally parallel with each other. The appropriate distance D of the drop portion 108 may be based upon the distance the tongue 112 may be desired to extend from the upper surface 105 of the hitch receiver attachment portion 104 to account for the use of the hitch ball mount 100.

The tongue 112 may extend from the drop portion 108. The tongue 112 may include a hitch ball aperture 134 positioned on the upper surface 130 of the tongue 112 and may extend through the tongue 112. The hitch ball aperture 134 may be shaped and sized to receive a hitch ball 131 with a fastener 132 that may be selectively engaged with the tongue 112 in any appropriate manner. By way of a non-limiting example, the hitch ball 131 may include a base 175 and a threaded member 133 extending from the base 175. The threaded member 133 may pass through the hitch ball aperture 134 and a nut 132b may threadingly engage the threaded member 133 securing the hitch ball 131 to the tongue 112. In addition, the lock washer 132a may be inserted onto the threaded member 133.

The hitch ball mount 100 may be integrally formed from a single tubular member. By way of a non-limiting example, the hitch ball mount 100 may be formed from a generally hollow tubular member 140, an exemplary embodiment of which is shown in FIG. 14. The hitch ball mount 100 may be forged, stamped or hydro-formed. In some embodiments, a thinner wall hollow tubular member may be used to create a one piece class I, II, or III (lighter duty) hitch ball mount 100 and in some embodiments a thicker walled hollow tubular member may be used to create a one-piece class IV or V (or heavy duty) hitch ball mount 100.

The tubular member 140 may be stamped or otherwise formed so as to form the hitch ball mount 100. The hitch ball mount 100 may therefore be a single integral piece or monolithic unit whereby no additional components may need to be added or otherwise attached. This may result in the hitch receiver portion 104, drop portion 108 and tongue 112 being a single integral piece or monolithic unit whereby no other items may need to be attached thereto. The hitch ball mount 100 may be formed in any appropriate manner. By way of a non-limiting example, the hitch ball mount 100 may be stamped from the tubular member 140 or may be hydroformed.

In some embodiments, the tubular member 141 may be generally circular in cross-section as shown in FIG. 14. In these embodiments, the receiver attachment portion 104 may be stamped in the appropriate shape. By way of a non-limiting example, an appropriate portion of the generally circular cross-sectional tubular member 141 may be stamped to form a generally rectangular or square cross-sectional receiver attachment portion 104 that may be capable of operatively engaging a hitch receiver. In these embodiments, the receiver attachment portion 104 may be stamped on all four sides at once so as to form the generally rectangular or square cross-sectional shape. Further, in these embodiments, the drop portion 108 and tongue 112 may be formed through subsequent operation.

In some embodiments, the tubular member 140 may be hardened by any appropriate manner, which may strengthen the metal used to form the hitch ball mount 100. This hardening may occur before forming the hitch ball mount 100, after forming the hitch ball mount 100, or both before and after forming the hitch ball mount 100. By way of a non-limiting example, the tubular member 140 may be work hardened by any appropriate manner before forming the hitch ball mount 100, after forming the hitch ball mount 100, or both before and after forming the hitch ball mount 100. Further yet, the hitch ball mount 100 may be annealed to change the material properties such before processing further, after formation or both.

Once the tubular member 140 is hardened or if it is not to be hardened until after formation or not hardened at all, the tubular member 140 may be placed in a die 145 of appropriate shape and size. The shape and size of the die 145 may depend upon the size and shape of the hitch ball mount 100 required. In the die 145, the tubular member 140 may be stamped by the appropriate process and machinery. The present teachings are not limited to a specific stamping process; any suitable stamping process may be used.

Upon stamping of the tubular member 140, the drop portion 108 may be formed. The stamp may engage the tubular member 140 between its first end and second end portions 142, 144 to form the drop portion 108. During this process, however, the first end portion 142 of the tubular member 140 may not be stamped such that it forms the hitch receiver portion 104. In some embodiments, the apertures 120 on the hitch receiver portion 104 may be formed in advance by any suitable process, such as by way of a non-limiting example, stamping, drilling or the like. In some embodiments, the apertures 120 may be formed after the hitch ball mount 100 is formed. Further in some embodiments, the apertures 120 may be formed generally simultaneously with the formation of the drop portion 108, the tongue 112, or the hitch ball aperture 134.

The stamped tubular member 140 with the drop portion 108 formed may be placed in another die. This combination may then be stamped, which may form a portion of the tongue 112 or alternatively, may form the entire tongue 112. If only a portion of the tongue 112 is formed, the stamped combination may be placed in yet another die to complete the formation of the tongue 112 or may remain in the same die to form the remainder of the tongue 112. Alternatively, the stamped tubular member 140 with the drop portion 108 may remain in the die used to form such and the combination may be further stamped which may form a portion of the tongue 112 or alternatively, may form the entire tongue 112. If only a portion of the tongue 112 is formed, the stamped combination may be placed in another die to complete the formation of the tongue 112 or may remain in the same die to form the remainder of the tongue 112

In some embodiments, the hitch ball aperture 134 may be formed by placing the hitch ball mount 100 having had the drop portion 108 and tongue 112 formed into another die and stamping the tongue 112, which may form the hitch ball mounting aperture 134. In some embodiments, the hitch ball aperture 134 may be formed simultaneously with the stamping of the tongue 112. In the alternative, the hitch ball aperture 134 may be formed by another process, such as by way of a non-limiting example, it may be drilled or the like.

In some embodiments, the tubular member 140 may be placed in a single die. In this die, the tubular member 140 may be stamped to form the drop portion 108. The combination may be stamped again to form at least a portion of the tongue 112, or may form the entire tongue 112 during the initial stamping process. If the tongue 112 is not completely formed, the combination may be stamped again to form the remainder of the tongue 112. This combination may be stamped to form the hitch ball aperture 134, or alternatively, the hitch ball aperture 134 may be formed with the tongue 112 during any of the stamping steps.

In some embodiments, the tubular member 140 may be placed in an appropriate die and the tubular member 140 be stamped once to form the entire hitch ball mount 100, including the drop portion 108, the tongue 112 and the hitch ball aperture 134. This may result in the hitch ball mount 100 being formed in a single step. Alternatively, the hitch ball mount 100 may be formed in progressive processes, but where the hitch ball mount 100 remains in a single die.

In some embodiments, the hitch ball mount 100 may be formed from a piece of hollow tube approximately 2" (50.8 mm) square with a wall thickness of approximately 0.24" (6 mm), this may be particularly suited for a class III draw bar. This tubular member 140 may be placed in a die and formed (with or without the application of heat) into the hitch ball mount 100 with a prearranged amount of drop configuration D. This drop configuration D can be all most negligible to a maximum limited by the tooling.

The hitch ball mount 100 being formed through stamping may eliminate weld stresses that may otherwise be present with the prior art hitch ball mounts as it may not be necessary to weld any additional components to the hitch ball mount 100. Additionally, forming the hitch ball mount 100 as described above may allow control of stress paths of the hitch ball mount 100 such that they may flow through the entire hitch ball mount 100 instead of occurring at the welds as may occur with the prior art hitch ball mounts.

While finishing operations may not be necessary for hitch ball mount 100, certain finishing operations may be desired for purely aesthetical reasons. In some embodiments, an end portion 150 of the tongue 112 may undergo a finishing operation, such as by way of a non-limiting example non-structural welding the end portion 150 to make it aesthetically pleasing. In addition or alternatively, the end portion 150 may be ground down or ground smooth to clean the end portion 150 or to shape the end portion 150 to a desired shape. The welding and grinding operations, however, may not be necessary.

In some embodiments, the tubular member 140A may be bent into a generally lazy S-formation as shown in FIG. 13 before stamping. Any appropriate method may be used to bend the tubular member 140A, such as by way of a non-limiting example, cold forming or mandrel bending the tubular member 104A. While a generally S-shape is shown, the present teachings are not limited to this shape. Any appropriate shape may be used. The generally S-shape may form the hitch receiver portion 104, the drop portion 108 and the tongue 112 once stamped. By way of a non-limiting example, a top of the bent generally S-shaped tubular member 140 may form the hitch receiver portion 104, a middle portion of the generally S-shaped bent tubular member 140 may form the drop portion 108 and a bottom of the generally S-shaped bent tubular member 140 may form the tongue 112. Once the tubular member 140A is bent, it may be stamped as indicated above. In some embodiments, while cold-forming and/or prior to cold-forming the tubular member 140A may be heated slightly to reduce work hardening. The cold-forming may work harden the tubular member 140A.

In the alternative, the hitch ball mount 100A may be formed solely by bending the tubular member 140A and not stamping further. In these embodiments, the tubular member 140A may be bent in a generally S-shape to form the hitch receiver portion 104A, the drop portion 108A and the tongue 112A. By way of a non-limiting example, a top of the bent generally S-shaped tubular member 140A may form the hitch receiver portion 104A, a middle portion of the generally S-shaped bent tubular member 140A may form the drop portion 108A and a bottom of the generally S-shaped bent tubular member 140A may form the tongue 112A. In this embodiment, the tongue 112A may not have a flattened end portion 150A, or in the alternative may have a flattened end portion similar to the embodiment shown in FIGS. 1-6.

A hitch ball mount 200 shown in FIGS. 16-21 may be formed with a larger drop/rise distance D. In order to accommodate taller towing vehicles a larger drop/rise distance D may be necessary for the hitch ball mount 200. The hitch ball mount 200 may be formed as described above. The larger drop/rise distance D, however, may require that the drop portion 208 be stamped more than once and/or may require a die of a different size. Alternatively, the drop/rise configuration D may be formed in a single stamping step. The remainder of the hitch ball mount 200 may likewise be formed as describe above.

A hitch ball mount 300 shown in FIGS. 22-27 may be formed with a shape that differs from the hitch ball mount 100. Specifically, the hitch receiver portion 304 may have a more generally square cross-sectional shape and the tongue 312 may have a different shape. Further, the drop portion 308 may have a different shape. The hitch ball mount 300 may be used with different shaped and sized trailer hitch receivers. The remainder of the hitch ball mount 300 may be formed as describe above. The dies to form such, however, may be of a different shape and sizes.

In some embodiments, a hitch ball mount 400 may have a tubular portion 416 that includes walls 455 that are generally thicker as shown in FIGS. 28-33. The hitch ball mount 400 having these thicker walls 455 may be formed as set forth above. The hitch ball mount 400 having thicker walls 455 may result in the hitch ball mount 400 being of a more robust construction so that it may be rated for higher classes of towing. As shown in FIGS. 28-33 the walls 455 being thicker may result in the tongue 412 being thicker—further resulting in a robust construction. Alternatively, however, the tongue 412 may not result in being thicker.

In some embodiments, a hitch ball mount 500 may have a tubular portion 516 that includes walls 555 that are generally thicker as shown in FIGS. 34-39. The hitch ball mount 500 may be formed as set forth above. The hitch ball mount 500 having thicker walls 555 may result in the tongue 512 being wider as indicated by W in FIG. 37. The wider tongue 512 may be desired depending upon the use of the hitch ball mount 500, and may result in the hitch ball mount 500 being of a more robust construction so that it may be rated for higher classes of towing.

In some embodiments shown in FIGS. 40-46, a hitch ball mount 600 may include an insert 662 positioned in the tongue 612, which may strengthen the hitch ball mount 600. This may result in a more robust construction that may be rated for higher classes of towing, which may permit towing of heavier items. The insert 662 may be used in addition to or in lieu of having thicker walls of the tubular portion 616. In some embodiments, an insert 662 of any appropriate shape, size and material may be inserted into the tubular member 640, such as for example in a second end portion 644 of the tubular member 640. The insert 662 may be inserted into the tubular member 640 at any appropriate time during the forming process. By way of a non-limiting example, the insert 662 may be added to the tubular member 640 before it may be cold-formed, such as when bent into a generally S shape. In another non-limiting example, the insert 662 may be inserted into the tubular member 640 after the tubular member 640 may be cold-formed. The tubular member 640 with the insert 662 inserted therein may be placed into a die and may be stamped to form the tongue 612. When stamped, the insert 662 may be sandwiched within the end portion 650 of the tongue 612. The insert 662 may be of a material that is harder than the tubular member 640. The insert 662 may act as an inner die that may not generally deform during stamping. This may increase the overall load capacity of the hitch ball mount 600.

Figure 46:
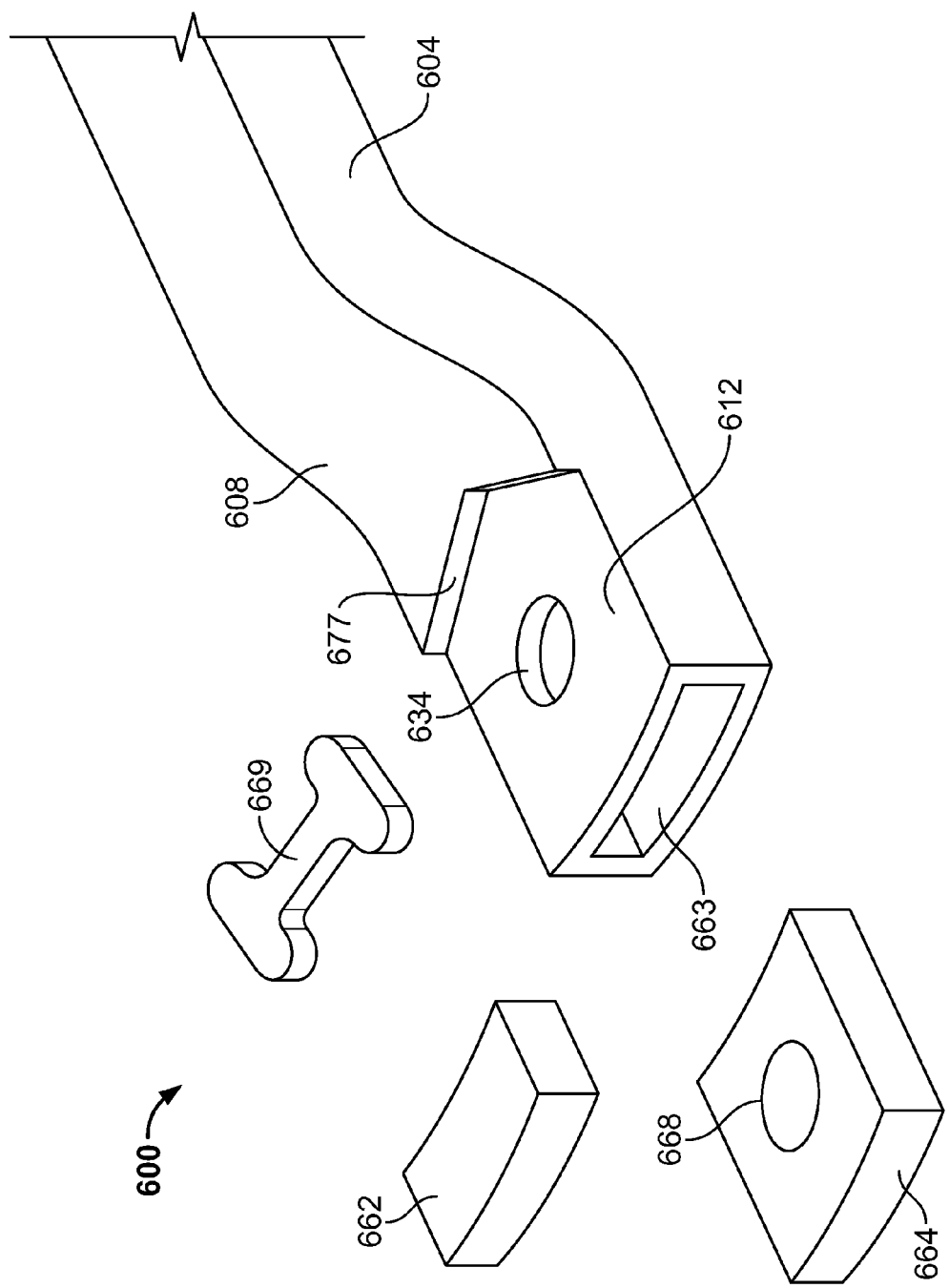
FIG. 46 is a perspective view of embodiments of a hitch ball mount including inserts.
Figure 47:
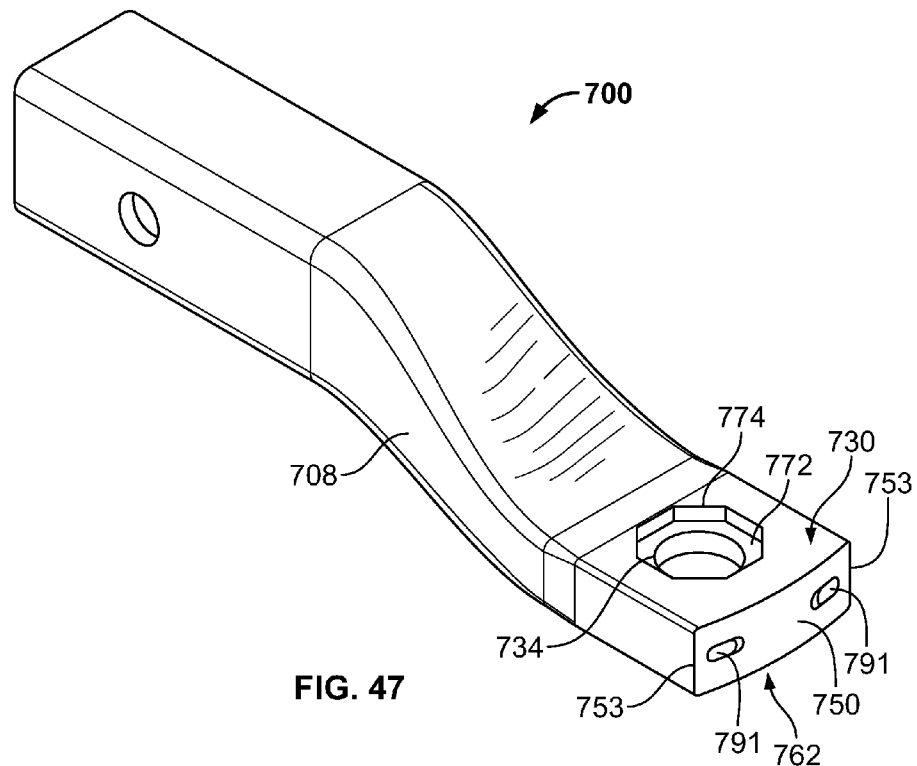
FIG. 47 is a front perspective view of embodiments of a hitch ball mount.
Figure 48:
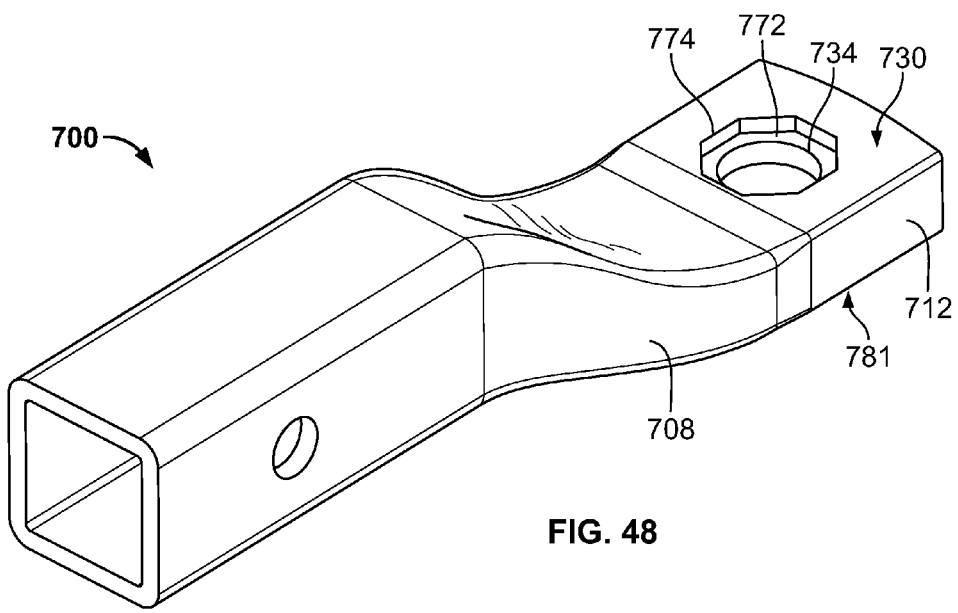
FIG. 48 is a rear perspective view of the hitch ball mount of FIG. 47.

Alternatively, a portion of the tongue 612 may be formed by way of non-limiting examples, cold-forming, stamping or a combination of both to form a cavity 663 shown in FIG. 46. Once the cavity 663 may be formed the insert 662 may be inserted within the cavity 663. The combination with the insert 662 in the cavity 663 may be placed in a die and stamped. This may result in the insert 662 being sandwiched at the end portion 650 of the tongue 612.

Alternatively, the insert 662 may be inserted within a die to form the tongue 612 with insert 662. In these embodiments, the tubular member 640 may be cold-formed, stamped or both. The insert 662 may be added to the die before or after cold-forming or before or after stamping of the tubular member. Once the insert 662 is in the die, immediately before stamping the tubular member 640, the insert 662 may be positioned within the tubular member 640, such as by way of a non-limiting example, in the second end portion 644 of the tubular member 640 and/or the cavity 663. The combination of the insert 662 and tubular member 640 may be stamped to form the tongue 612 with insert 662.

The insert 662 may be any appropriate shape or size and are not limited to those shown in FIG. 46. By way of a non-limiting example, the insert 662 may be a single rectangular box of metal or it could be two or more pieces of metal that may be sandwiched in the tongue 612 during forming. By way of another non-limiting example, an insert 664 may be a single rectangular box of metal that includes an aperture 668 that may correspond with the hitch ball aperture 634 of the tongue 612. In this embodiment, the insert 664 may be sandwiched in the tongue 612 whereby forming the hitch ball aperture 634 may not require stamping, drilling or the like, the insert 664 as the aperture 668 is already formed therein. In some embodiments, a plurality of inserts may be used in association with the tongue 612 such that the inserts may be shaped in such a way to eliminate their ability of working their way free. By way of a non-limiting example, the inserts may have a generally dog bone shape 669, as shown in FIG. 46.

Utilizing the inserts 662, 664, 669 may permit the tubular member 640 to have a thinner sidewall 655 while retaining the required strength. In these embodiments, the inserts 662, 664, 669 may be steel or another material. In some non-limiting examples, the inserts 662, 664, 669 may be of a metal which may be more malleable, may be of a material that has a hardness that is generally different from the tubular member 640, or may be of a material that has generally different strength properties than the tubular member 640. The inserts 662, 664, 669 may provide the tongue 612 with added strength, which may make the hitch ball mount 600 more robust—resulting in it being capable of being used with higher classes of towing or heavier towing. The hitch ball mount 600 may otherwise be formed as describe above. The hitch ball mount 600 may include a drop portion 608 and may include a stepped wall 677 that may be positioned between the drop portion 608 and the tongue 612. The stepped wall 677 may be capable of engaging a hitch ball such as the base 175 of the hitch ball 131. In these embodiments, the stepped wall 677 engaging the base 175 of the hitch ball 131 may generally prevent rotation of the hitch ball 131 during installation thereof on to the hitch ball mount 600. More specifically, the stepped wall 677 may generally prevent the hitch ball 131 from rotating while the fastener 132 is being engaged with the threaded member 133 of the hitch ball 131 during installation.

In some embodiments, such as those shown in FIGS. 47-52, a hitch ball mount 700 may include a hitch ball aperture 734 provided in the tongue 712. A recess 772 may be provided around the hitch ball aperture 734 in an upper surface 730 or face of the tongue 712. Alternatively or in addition, a second recess (not shown) may be provided around the hitch ball aperture 734 in a second face 781 of the tongue 712. The recess 772 may have a generally non-circular shape. By way of a non-limiting example, the recess 772 may assume an oval, polygonal, square, rectangular, hexagonal, and star shape, or a combination thereof. The second recess may have a generally non-circular shape. The shape of the second recess, by way of a non-limiting example, may assume an oval, polygonal, square, rectangular, hexagonal, and star shape, or a combination thereof. The recess 772 and the second recess may be of a generally identical shape or may possess different shapes.

Figure 53:
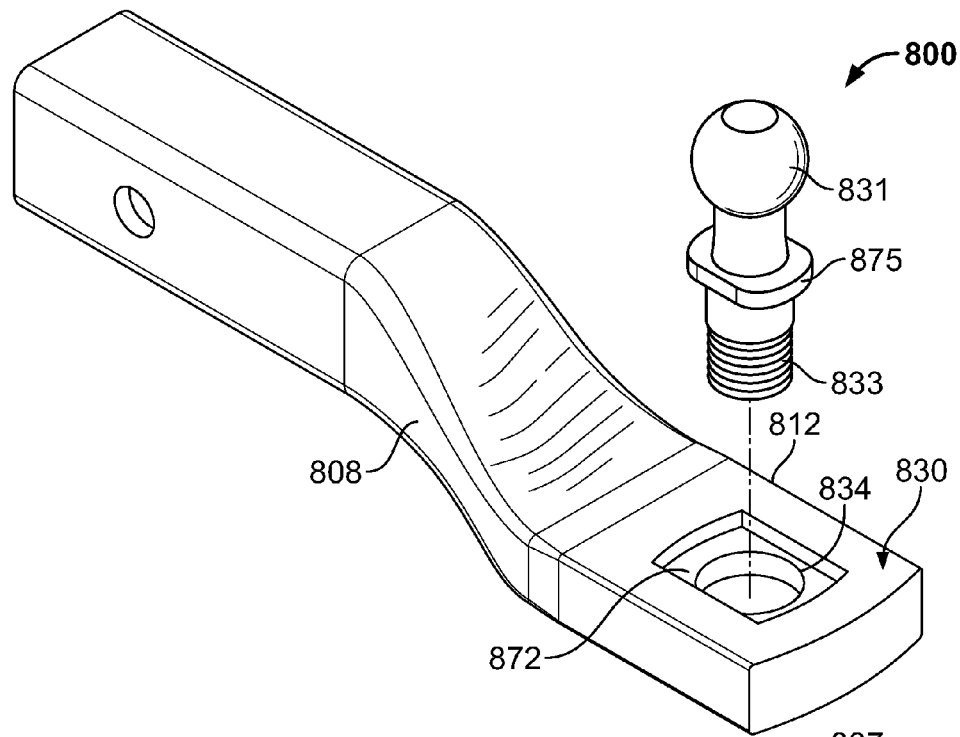
FIG. 53 is a front perspective view of embodiments of a hitch ball mount.
Figure 54:
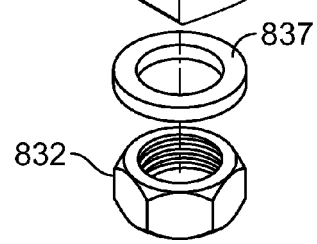
FIG. 54 is a rear perspective view of the hitch ball mount of FIG. 53.
Figure 54:
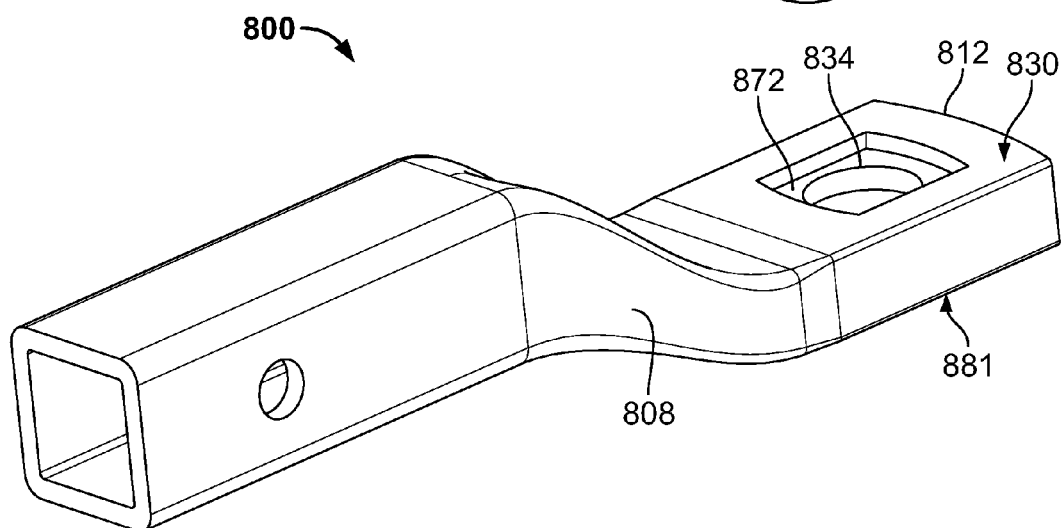
Figure 55:
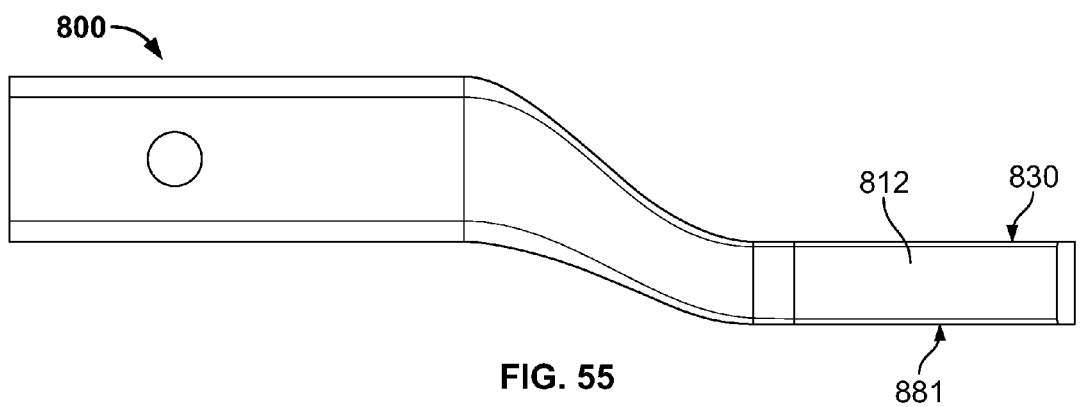
FIG. 55 is a side view of the hitch ball mount of FIG. 53.
Figure 56:
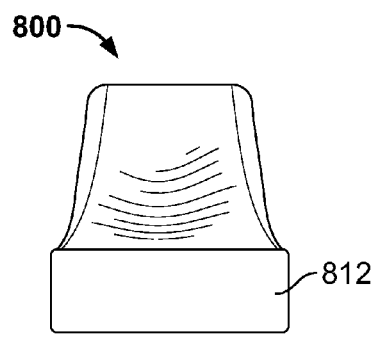
FIG. 56 is a front view of the hitch ball mount of FIG. 53.
Figure 57:
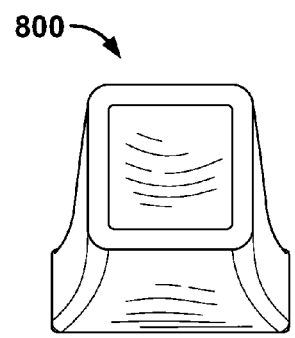
FIG. 57 is a rear view of the hitch ball mount of FIG. 53.
Figure 58:
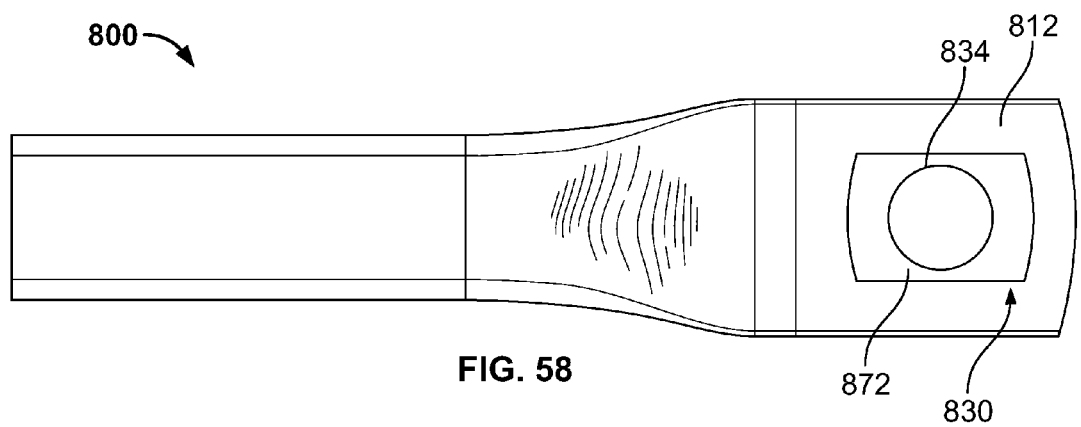
FIG. 58 is top view of the hitch ball mount of FIG. 53.

In these embodiments, a hitch ball 831, an example of which is shown in FIG. 53, having a base 875 and threaded mounting shank 833 may be capable of being selectively secured in the hitch ball aperture 734. The base 875 may be correspondingly sized and shaped to be received and held in at least one of the recess 772 and/or the second recess. Thus, the base 875 may fit in and generally fill the recess 772.

A fastener 832 may be provided for engaging the shank 833 and securing the hitch ball 831 to the hitch ball mount 700, such as by way of a non-limiting example, the fastener 833 may be a nut 833 and a lock washer 837. Alternatively, a self-locking nut may be utilized.

The hitch ball 831 may be easily and conveniently connected to the hitch ball mount 700. The mounting shank 833 of the hitch ball 831 may be aligned with and pushed through the hitch ball aperture 734 in the tongue 712. As this is done the base 875 of the hitch ball 831 may be seated in the recess 772. Once seated, a sidewall 774 of the recess 772 may engage a side or sides of the base 875 so as to effectively prevent the hitch ball 831 from rotating relative to the hitch ball mount 700. The lock washer 837 may be placed over the mounting shank 833 and the nut 832 may then be tightened on that mounting shank 833 to complete the connection. During the tightening process, the engagement of the base 875 of the hitch ball 831 with the sidewall 774 of the recess 772 may generally prevent rotation of the hitch ball 831 in the hitch ball mount 700 and therefore may allow connection with a single tool.

Figure 49:
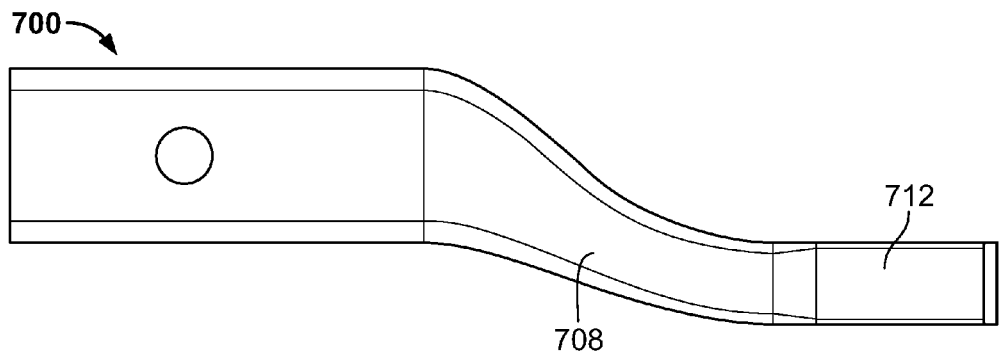
FIG. 49 is a side view of the hitch ball mount of FIG. 47.
Figure 50:
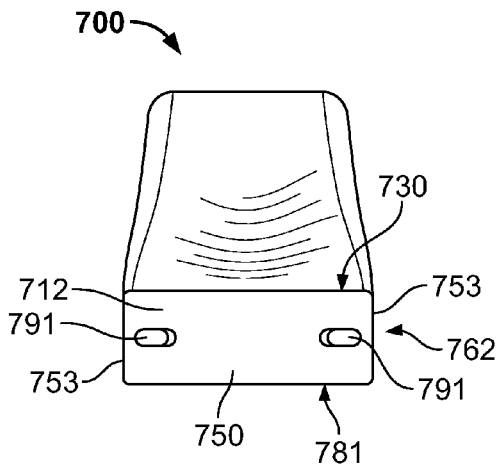
FIG. 50 is a front view of the hitch ball mount of FIG. 47.
Figure 51:
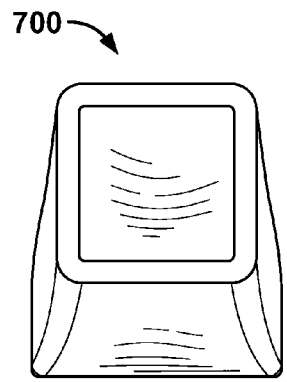
FIG. 51 is a rear view of the hitch ball mount of FIG. 47.
Figure 52:
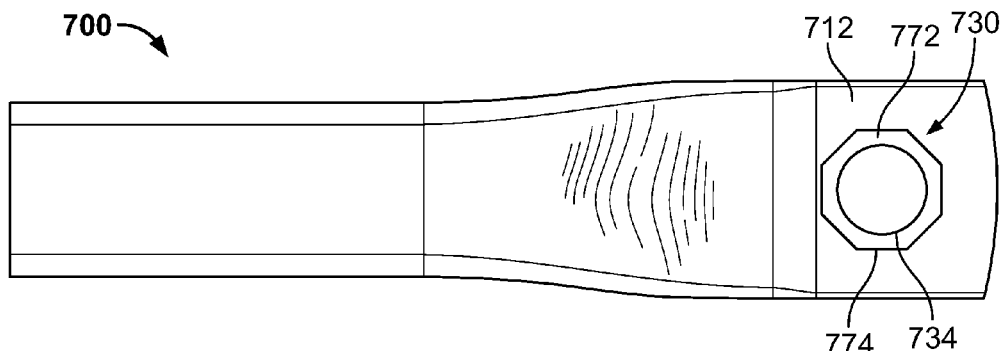
FIG. 52 is top view of the hitch ball mount of FIG. 47.

In some embodiments, the hitch ball mount 700 may be utilized with the tongue 712 directed downward or upward, i.e., the drop portion 708 may either extend downward as is shown in FIG. 49 or may extend upward. By way of a non-limiting example, the tongue 712 may include a recess 772 and a second recess (not shown) on each of the faces 730, 781. The base (not shown) of a hitch ball (not shown) may be capable of being received in one recess, in the other recess, or being received in both recesses. In the embodiments in which the base is capable of being received in both recesses, the hitch ball (not shown) may be prevented from rotation in either operating position to allow simple and convenient connection. Moreover, the hitch ball mount 700 may be capable of selectively attaching to a hitch receiver in a first position whereby the first face 730 faces upward and the second face 781 faces downward and a second position whereby the second face 781 faces upward and the first face 730 faces downward.

In this embodiment, an insert 762 may be utilized to help form the recess 774. The insert 762 may be of any appropriate shape and size. By way of a non-limiting example, rods 791 may be inserted into edges 753 of the second end portion 750 of the tongue 716. The rods 719 may be used to better hold the sidewall 774 of the recess 772 to form the non-circular recesses. The hitch ball mount 700 may otherwise be formed as described above.

In some embodiments, such as those shown in FIGS. 53-58, a hitch ball mount 800 may include a hitch ball aperture 834 provided in the tongue 812. The hitch ball aperture 834 may be capable of operatively attaching a hitch ball 831 with a nut 832. In some embodiments, a recess 872 may be provided around the hitch ball aperture 834 in an upper surface 830 or face of the tongue 812. Alternatively or in addition, a second recess (not shown) may be provided around the hitch ball aperture 834 in a second face 881 of the tongue 812.

The recess 872 may have a generally non-circular shape. By way of a non-limiting example, the recess 872 may assume an oval, polygonal, square, rectangular, hexagonal, and star shape, or a combination thereof. The second recess (not shown) may have a generally non-circular shape. The shape of the second recess, by way of a non-limiting example, may assume an oval, polygonal, square, rectangular, hexagonal, and star shape, or a combination thereof. The recess 872 and the second recess may be generally identical or may possess different shapes. This may allow the hitch ball mount 800 to be selectively attachable to a hitch receiver in a first and second position. The recess 872 may engage a base 875 of the hitch ball 831 to prevent rotation of the hitch ball 831 during installation thereof onto the tongue 812. More specifically, the base 875 may engage the recess 872 to prevent rotation of the hitch ball 831 while the nut 832 may be screwed onto the hitch ball 831.

Figure 59:
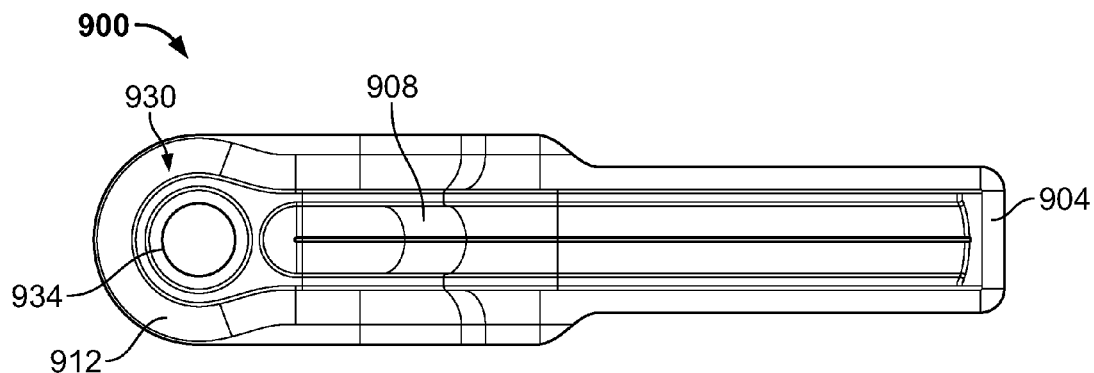
FIG. 59 is a top view of embodiments of a hitch ball mount.
Figure 60:
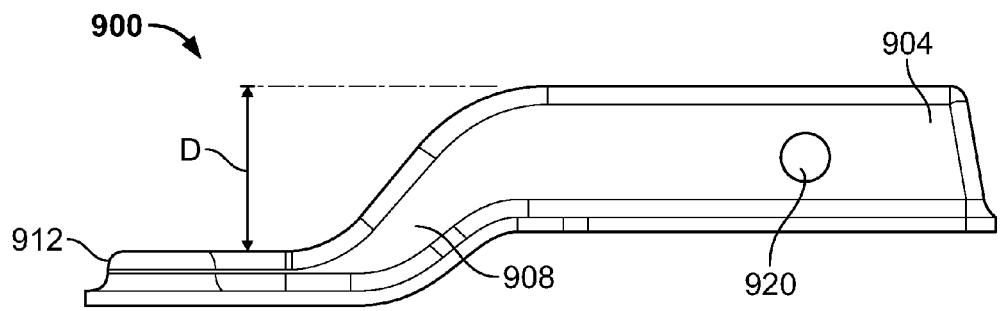
FIG. 60 is a side view of the hitch ball mount of FIG. 59.
Figure 61:
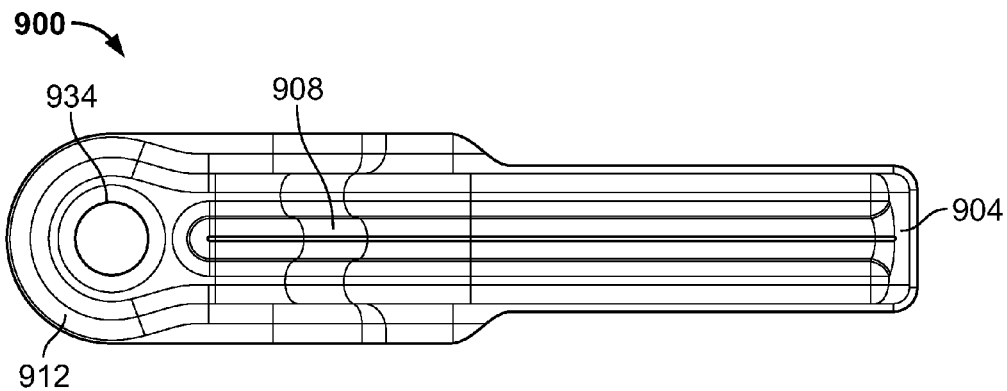
FIG. 61 is a bottom view of the hitch ball mount of FIG. 59.

In some embodiments, a hitch ball mount 900 may be formed from a generally planar plate as shown in FIGS. 59-61. In these embodiments, the generally planar plate may be stamped to form the hitch ball mount 900. Specifically, the generally planar plate may be placed in a die of appropriate shape and size. The shape and size of the die may depend upon the size and shape of the hitch ball mount 900 required. In the die, generally planar plate may be stamped by the appropriate process and machinery. The present teachings are not limited to a specific stamping process; any suitable stamping process may be used, such as by way of a non-limiting example hydro-forming.

Upon stamping of the generally planar plate, the hitch receiver portion 904, the drop portion 908, and tongue 912 may all be formed. Apertures 920 on the hitch receiver portion 904 may be formed in advance by any suitable process, such as by way of a non-limiting example, stamping, drilling or the like. The apertures 920 may be formed after the hitch ball mount 900 is formed. Further, the apertures 920 may be formed generally simultaneously with the formation of the hitch receiver portion 904, the drop portion 908, the tongue 912, and/or the hitch ball aperture 934.

The hitch receiver portion 904, the drop portion 908, and tongue 912 may be formed generally simultaneously or may be formed in progressive steps. In addition, a hitch ball aperture 934 may be formed by stamping the tongue 912 generally simultaneously with the remainder of the hitch ball mount or may by formed as part of a progressive step. In addition, the hitch ball aperture 934 may be formed by another process, such as by way of a non-limiting example, it may be drilled or the like.

The drop portion 908 may be formed with any appropriately sized drop/rise configuration 926, which may also include a zero drop whereby the hitch receiver portion 904, the drop portion 908 and the tongue 912 may be generally planar. The drop/rise configuration 926 may be controlled by the size of the generally planar plate used, how much the drop portion 908 is displaced when stamped, or by any combination of such.

Figure 62:
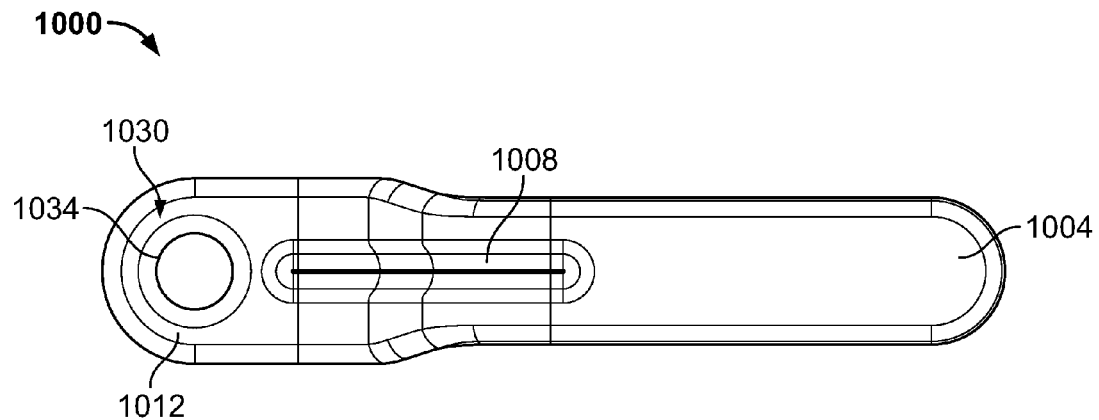
FIG. 62 is a top view of embodiments of a hitch ball mount.
Figure 63:
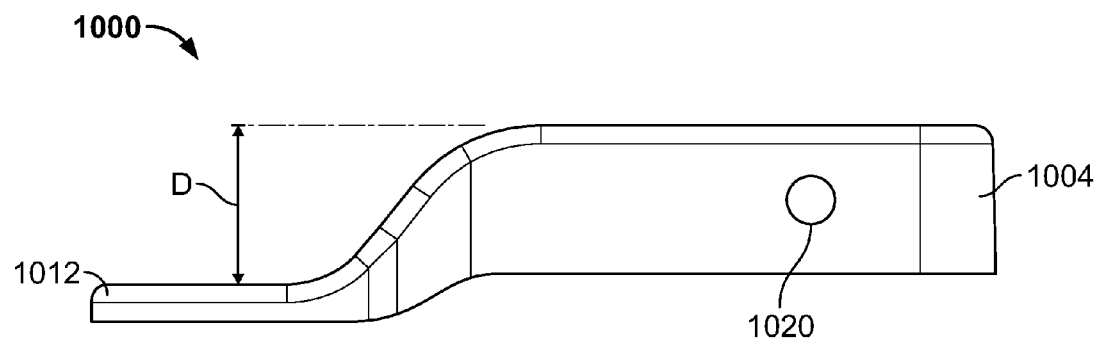
FIG. 63 is a side view of the hitch ball mount of FIG. 62.
Figure 64:
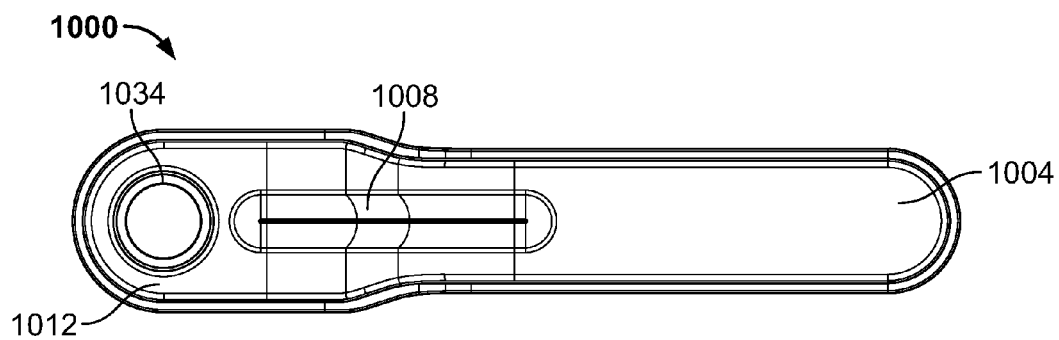
FIG. 64 is a bottom view of the hitch ball mount of FIG. 62.

In some embodiments, a hitch ball mount 1000 may be formed from a generally planar plate as shown in FIGS. 62-64. In these embodiments, the generally planar plate may be stamped to form the hitch ball mount 1000. Specifically, the generally planar plate may be placed in a die of appropriate shape and size. The shape and size of the die may depend upon the size and shape of the hitch ball mount 1000 required. In the die, generally planar plate may be stamped by the appropriate process and machinery. The present teachings are not limited to a specific stamping process; any suitable stamping process may be used, such as by way of a non-limiting example hydro-forming.

Upon stamping of the generally planar plate, the hitch receiver portion 1004, the drop portion 1008, and tongue 1012 may all be formed. Apertures 1020 on the hitch receiver portion 1004 may be formed in advance by any suitable process, such as by way of a non-limiting example, stamping, drilling or the like. The apertures 1020 may be formed after the hitch ball mount 1000 is formed. Further, the apertures 1020 may be formed generally simultaneously with the formation of the hitch receiver portion 1004, the drop portion 1008, the tongue 1012, and/or the hitch ball aperture 1034.

The hitch receiver portion 1004, the drop portion 1008, and tongue 1012 may be formed generally simultaneously or may be formed in progressive steps. In addition, a hitch ball aperture 1034 may be formed by stamping the tongue 1012 generally simultaneously with the remainder of the hitch ball mount or may by formed as part of a progressive step. In addition, the hitch ball aperture 1034 may be formed by another process, such as by way of a non-limiting example, it may be drilled or the like.

The drop portion 1008 may be formed with any appropriately sized drop/rise configuration 1026. The drop/rise configuration 1026 may be controlled by the size of the generally planar plate used, how much the drop portion 1008 is displaced when stamped, or by any combination of such.

Figure 65:
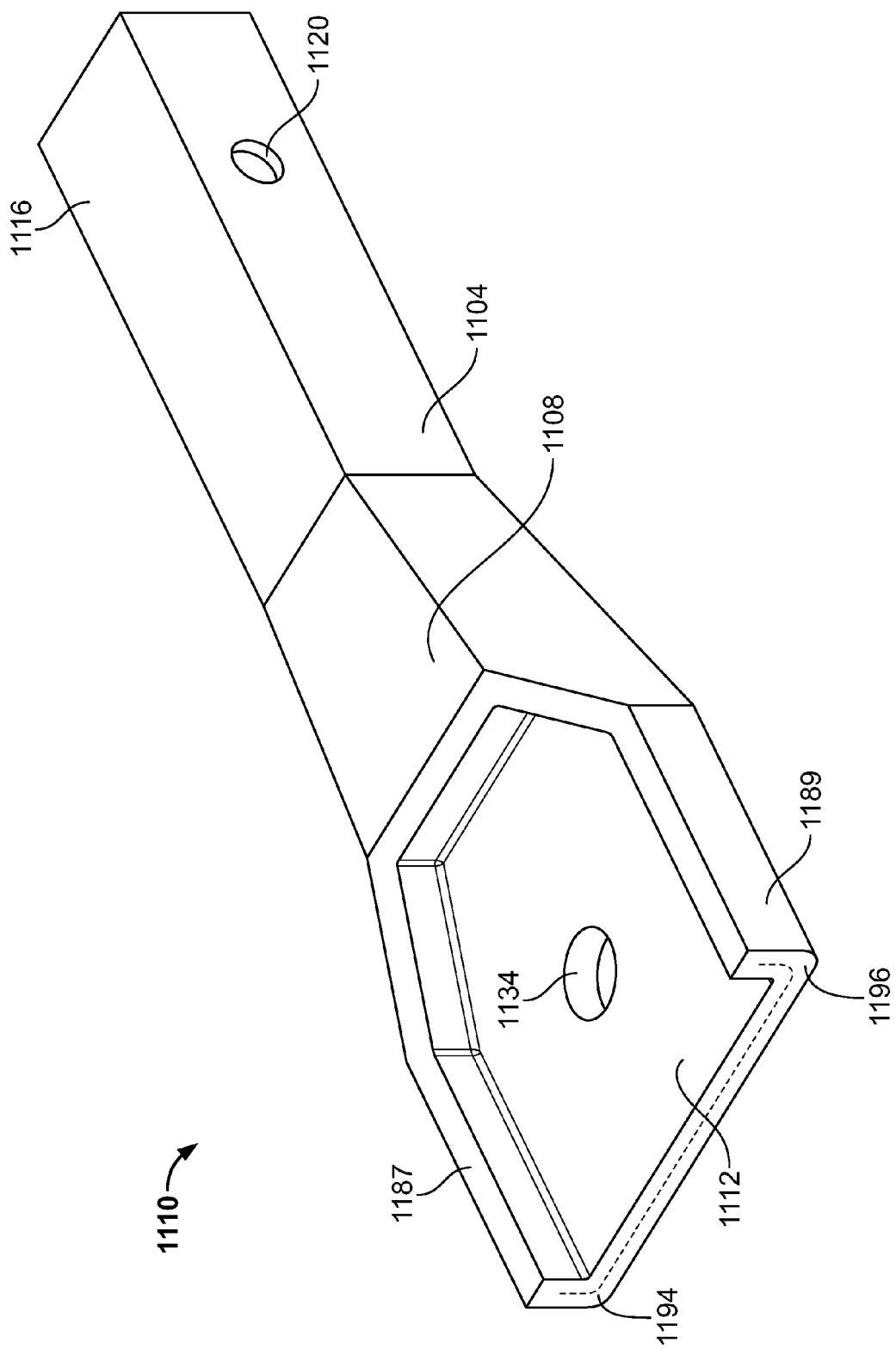
FIG. 65 is a perspective view of embodiments of a hitch ball mount.

In embodiments shown in FIG. 65, a hitch ball mount 1100 may include a hitch receiver portion 1104, a drop portion 1108, and a tongue 1112; all of which may be formed by stamping as described above. The tongue 1112 may include first and second end portions 1187, 1189 respectively. These end portions 1187, 1189 may include generally bent portions 1194, 1196 that may likewise be formed by stamping. The bent portions 1194, 1196 may be formed simultaneously with the stamping that may form the hitch receiver portion 1104, drop portion 1108, and/or tongue 1112. Alternatively, the bent portions 1194, 1196 may be formed in a progressive step such as by way of a non-limiting example stamping the tongue 1112. As shown in FIG. 65, the tongue 1112 may include a hitch ball aperture 1134, which may be formed as described above.

Figure 66:
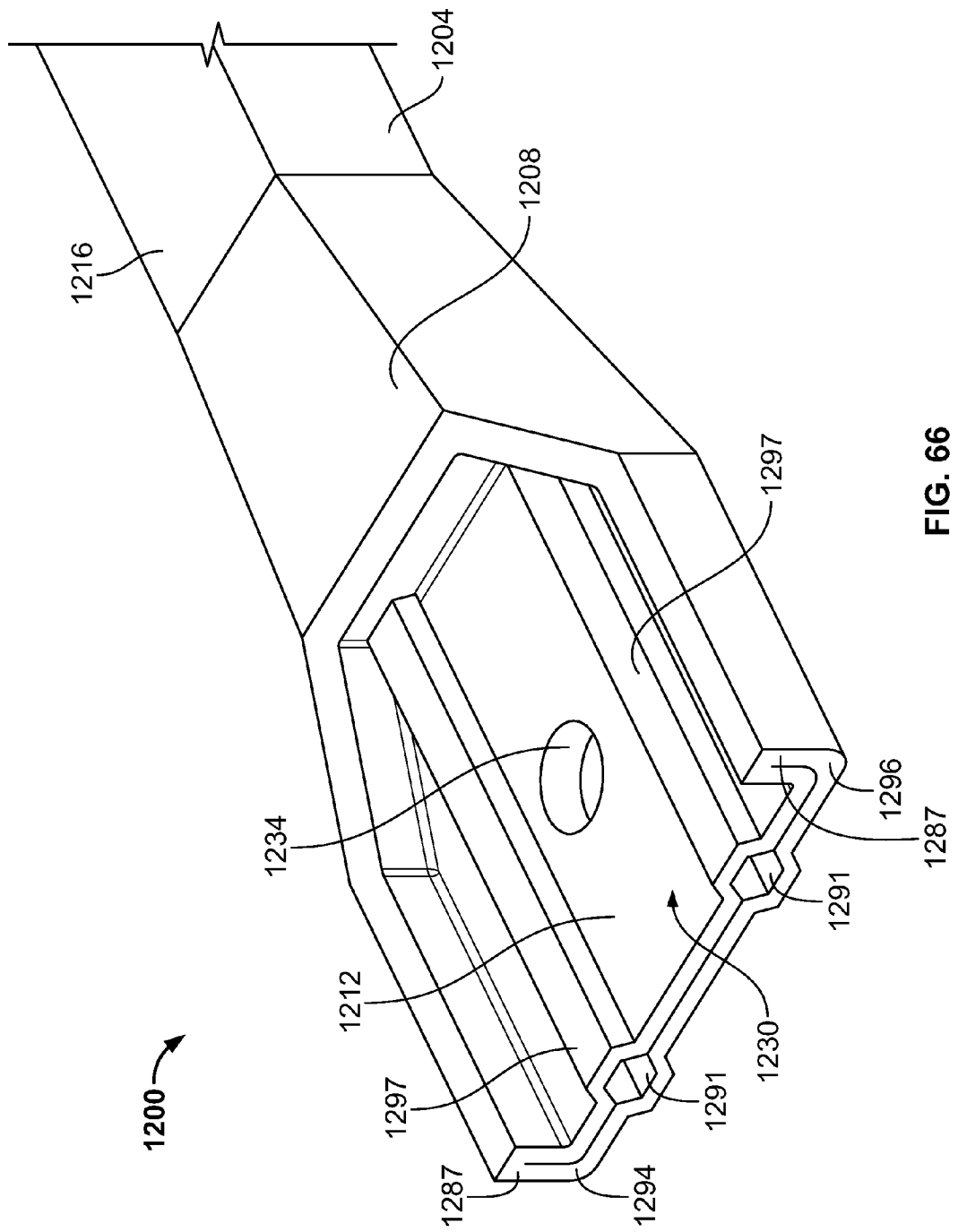
FIG. 66 is a perspective view of embodiments of a hitch ball mount.

In embodiments shown in FIG. 66, a hitch ball mount 1200 may include a hitch receiver portion 1204, a drop portion 1208, and a tongue 1212; all of which may be formed by stamping as described above. The tongue 1212 may include first and second end portions 1287, 1289 respectively. These end portions 1287, 1289 may include generally bent portions 1294, 1296 that may likewise be formed by stamping. The bent portions 1294, 1296 may be formed simultaneously with the stamping that may form the hitch receiver portion 1204, drop portion 1208, and/or tongue 1212. Alternatively, the bent portions 1294, 1296 may be formed in a progressive step such as by way of a non-limiting example stamping the tongue 1212. As shown in FIG. 66, the tongue 1212 may include a hitch ball aperture 1234, which may be formed as described above. In these embodiments, inserts 1291 may be used and may be sandwiched in the tongue 1212 as described above. The shape and size of the inserts 1291 may be such that generally raised longitudinal members 1297 may be formed on an upper surface 1230 of the tongue 1212.

Figure 69:
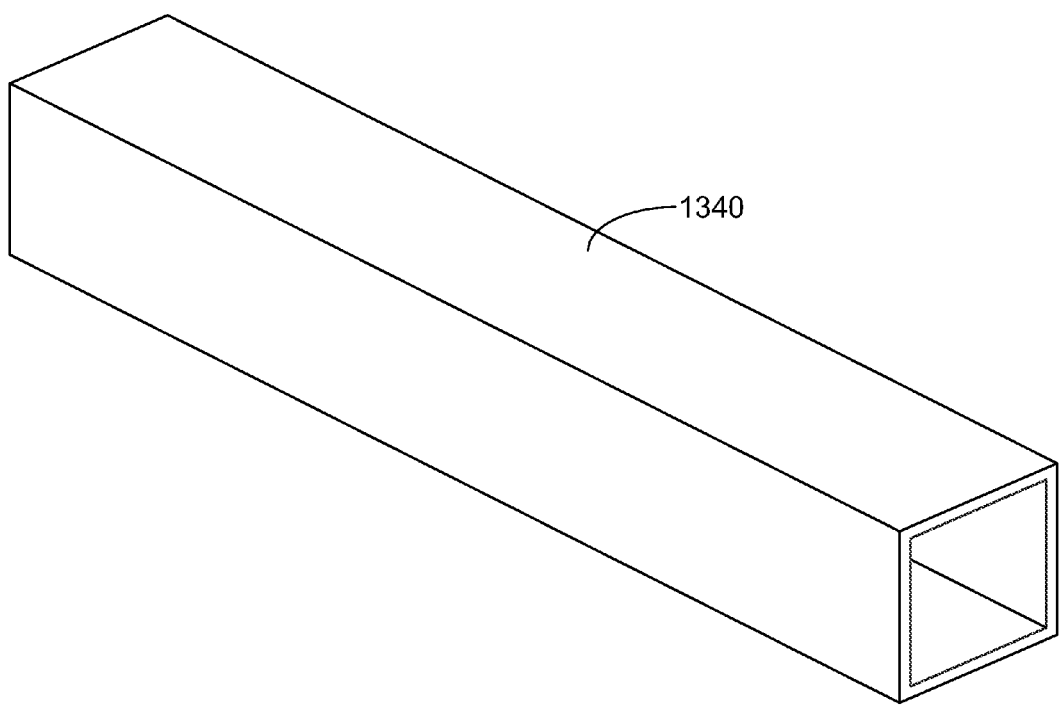
FIG. 69 is a perspective view of embodiments of a tubular member of a hitch ball mount.
Figure 70:
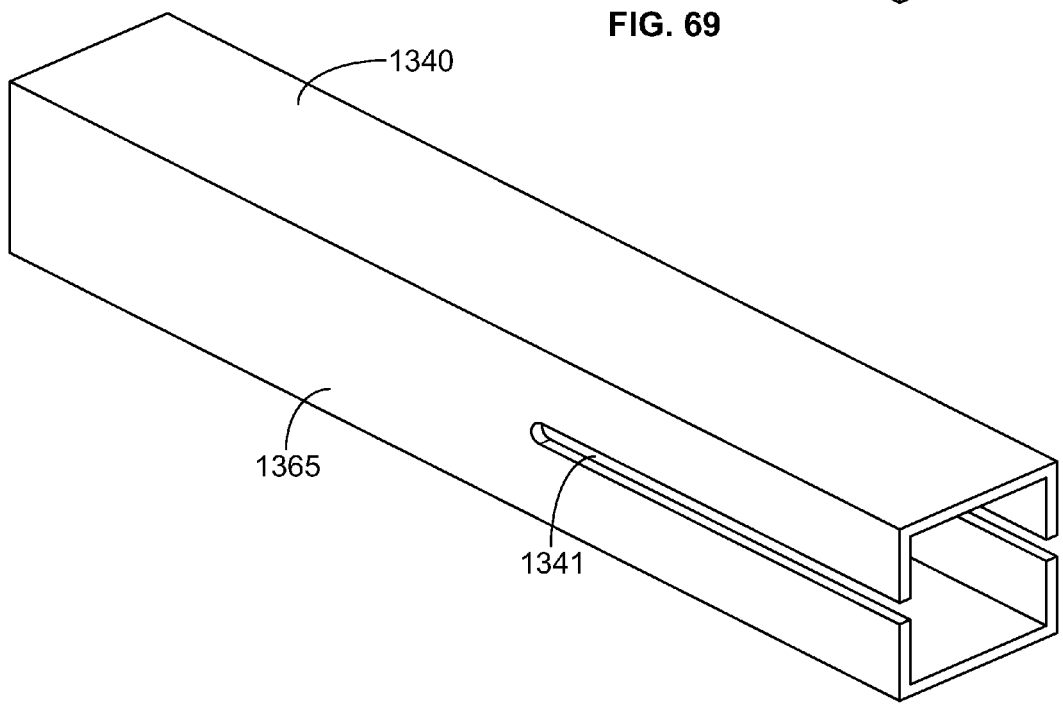
FIG. 70 is a perspective view of embodiments of the tubular member with a slot.
Figure 71:
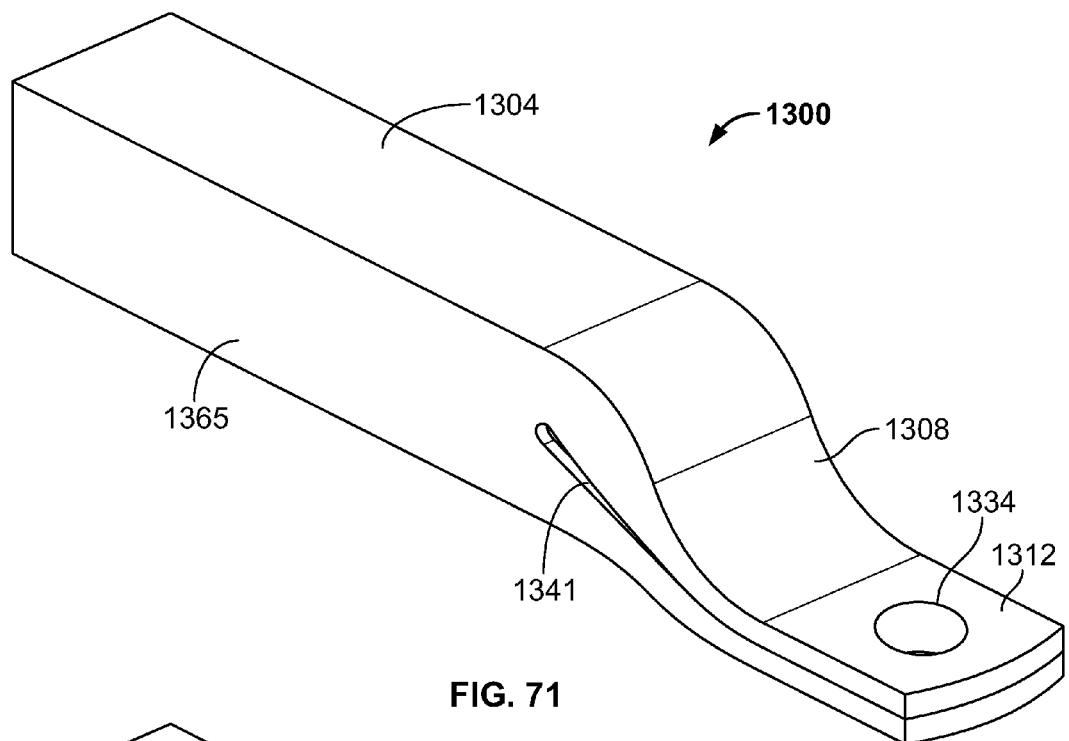
FIG. 71 is a perspective view of embodiments of the hitch ball mount.

A hitch ball mount 1300 may be formed from generally hollow tubular member 1340 as shown in FIGS. 69-71. In these embodiments, a portion 1341 of the generally hollow tubular member 1340 may be removed by any appropriate manner, such as for example cutting, machining a groove or otherwise generally removing the portion 1341 of the tubular member 1340. Once the portion 1341 is removed from the generally hollow tubular member 1340, the generally hollow tubular member 1340 may be stamped to form a hitch ball mount 1300. Removing the portion 1341 may generally remove or eliminate the stresses in a side wall 1365 of the hitch ball mount 1300 when stamped.

The portion 1341 removed from the tubular member 1340 may be of any appropriate shape and size. By way of a non-limiting example, the portion 1341 may be of any appropriate width. Further, the portion 1341 removed from the tubular member 1340 may be generally linear, s-shape, arched, or the like. By way of a non-limiting example, the portion 1341 may be a hole, a slit, a slotted hole, or a slot of any profile. The portion 1341 removed from the tubular member 1340 may be in any portion of the sidewall 1365; it is not limited to the general center of the tubular member 1340 as shown in FIG. 70. The portion 1341 removed from the tubular member 1340 may be formed in any appropriate manner. By way of a non-limited example, the removed portion 1341 may be cut with a saw, mill, plasma cutter, water jet, laser, or the like.

Upon stamping of the tubular member 1340 with the removed portion 1341, the hitch receiver portion 1304, the drop portion 1308, and tongue 1312 may all be formed. As shown in FIG. 71, the tubular member 1340 may be stamped so that the location of the removed portion 1341 may form the drop portion 1308 and the tongue 1312. The hitch receiver portion 1304, the drop portion 1308, and tongue 1312 may be formed generally simultaneously or may be formed in progressive steps. In addition, a hitch ball aperture 1334 may be formed by stamping the tongue 1312 generally simultaneously with the remainder of the hitch ball mount or may by formed as part of a progressive step. In addition, the hitch ball aperture 1334 may be formed by another process, such as by way of a non-limiting example, it may be drilled or the like.

Figure 72:
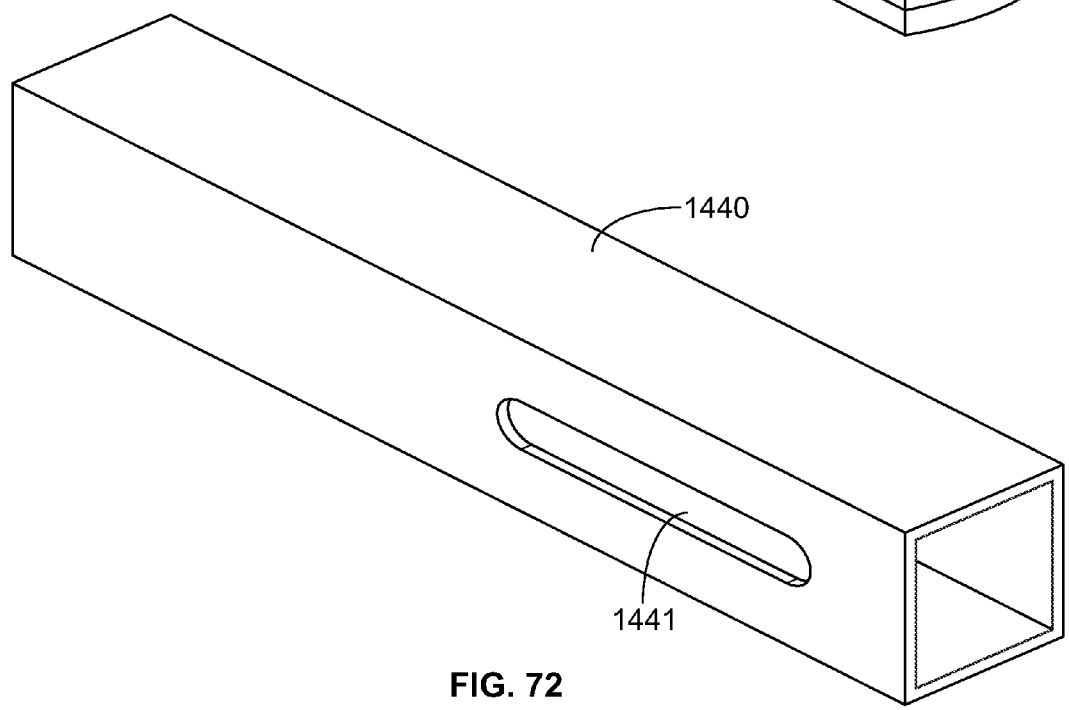
FIG. 72 is a perspective view of embodiments of a tubular member of a hitch ball mount.
Figure 73:
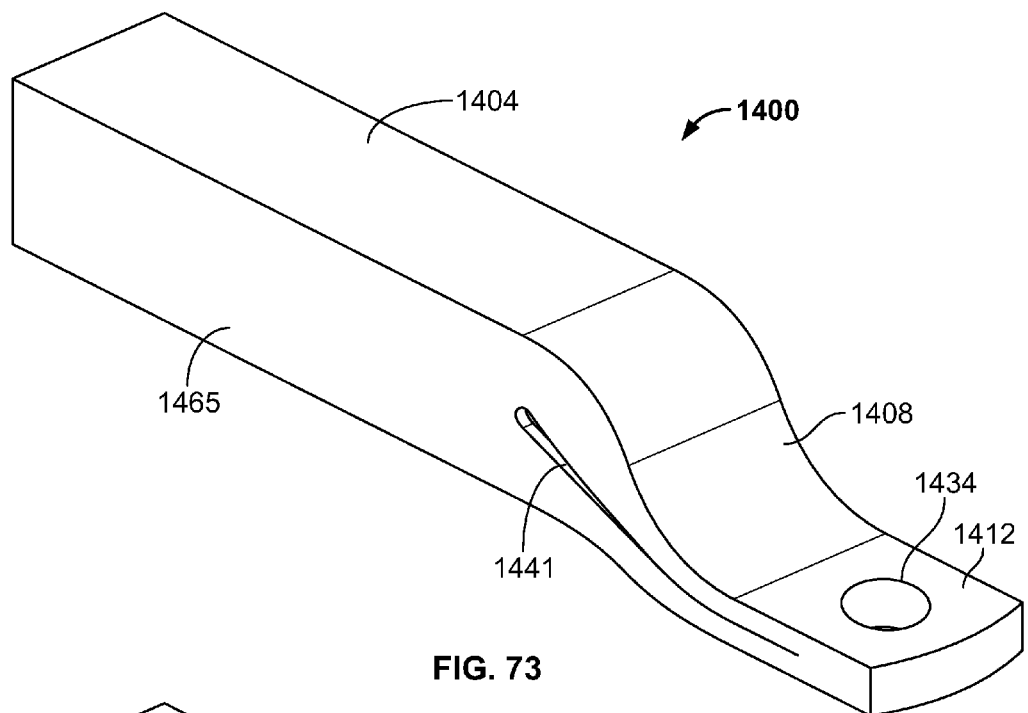
FIG. 73 is a perspective view of embodiments of a hitch ball mount.

In some embodiments, a hitch ball mount 1400 may be formed from generally hollow tubular member 1440 as shown in FIGS. 72 and 73. In these embodiments, a portion 1441 of the generally hollow tubular member 1440 may be removed by any appropriate manner, such as for example cutting, machining a groove or otherwise generally removing the portion 1441 of the tubular member 1440. Once the portion 1441 is removed from the generally hollow tubular member 1440, the generally hollow tubular member 1440 may be stamped to form a hitch ball mount 1400. Removing the portion 1441 may generally remove or eliminate the stresses in a side wall 1465 of the hitch ball mount 1400 when stamped.

The portion 1441 removed from the tubular member 1440 may be of any appropriate shape and size. By way of a non-limiting example, the portion 1441 may be of any appropriate width. Further, the portion 1441 removed from the tubular member 1440 may be generally linear, s-shape, arched, or the like. By way of a non-limiting example, the portion 1441 may be a hole, a slit, a slotted hole, or a slot of any profile. The portion 1441 removed from the tubular member 1440 may be in any portion of the sidewall 1465; it is not limited to the general center of the tubular member 1440 as shown in FIG. 72. The portion 1441 removed from the tubular member 1440 may be formed in any appropriate manner. By way of a non-limited example, the removed portion 1441 may be cut with a saw, mill, plasma cutter, water jet, laser, or the like. The removed portion 1441 may be positioned at any appropriate position along with tubular member 1440. It may be positioned in proximity to an end portion thereof, but may not extend all the way to the end as shown.

Figure 74:
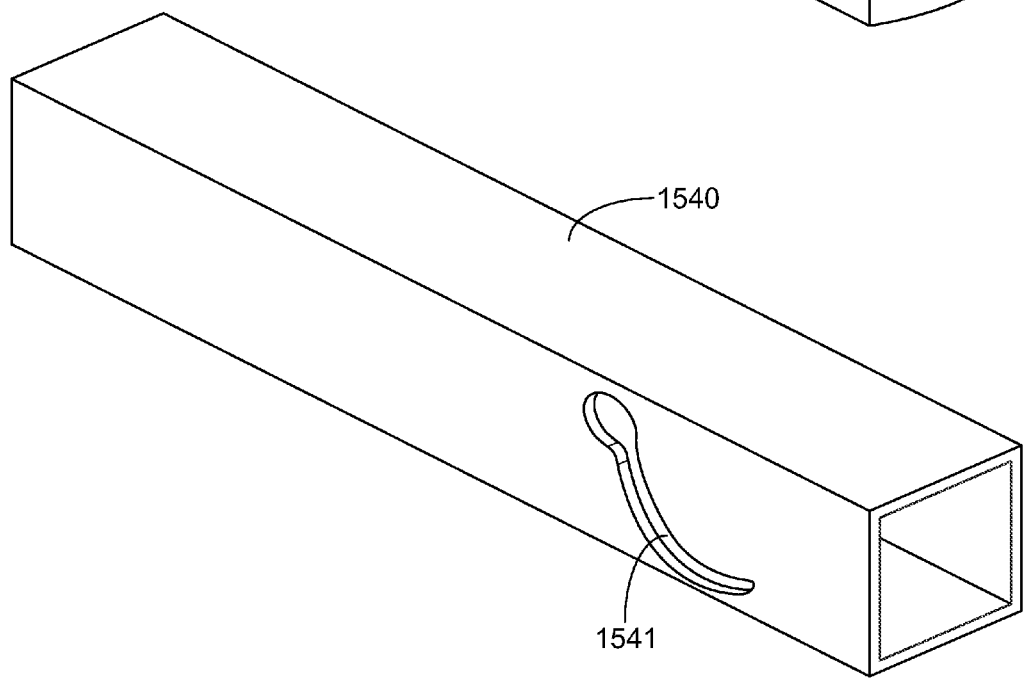
FIG. 74 is a perspective view of embodiments of a tubular member of a hitch ball mount.

Upon stamping of the tubular member 1440 with the removed portion 1441, the hitch receiver portion 1404, the drop portion 1408, and tongue 1412 may all be formed. As shown in FIG. 74, the tubular member 1440 may be stamped so that the location of the removed portion 1441 may form the drop portion 1408 and a portion of the tongue 1412, but may not extend to an end of the tongue 1412. The hitch receiver portion 1404, the drop portion 1408, and tongue 1412 may be formed generally simultaneously or may be formed in progressive steps. In addition, a hitch ball aperture 1434 may be formed by stamping the tongue 1412 generally simultaneously with the remainder of the hitch ball mount or may be formed as part of a progressive step. In other embodiments, the hitch ball aperture 1434 may be formed by another process, such as by way of a non-limiting example, it may be drilled or the like.

In some embodiments, a removed portion 1541 may include a generally backward S-shape with a hole formed in a generally tubular member 1540 as shown in FIG. 74. The removed portion 1541 may be of any appropriate shape and size and the present teachings are not limited to such.

Figure 75:
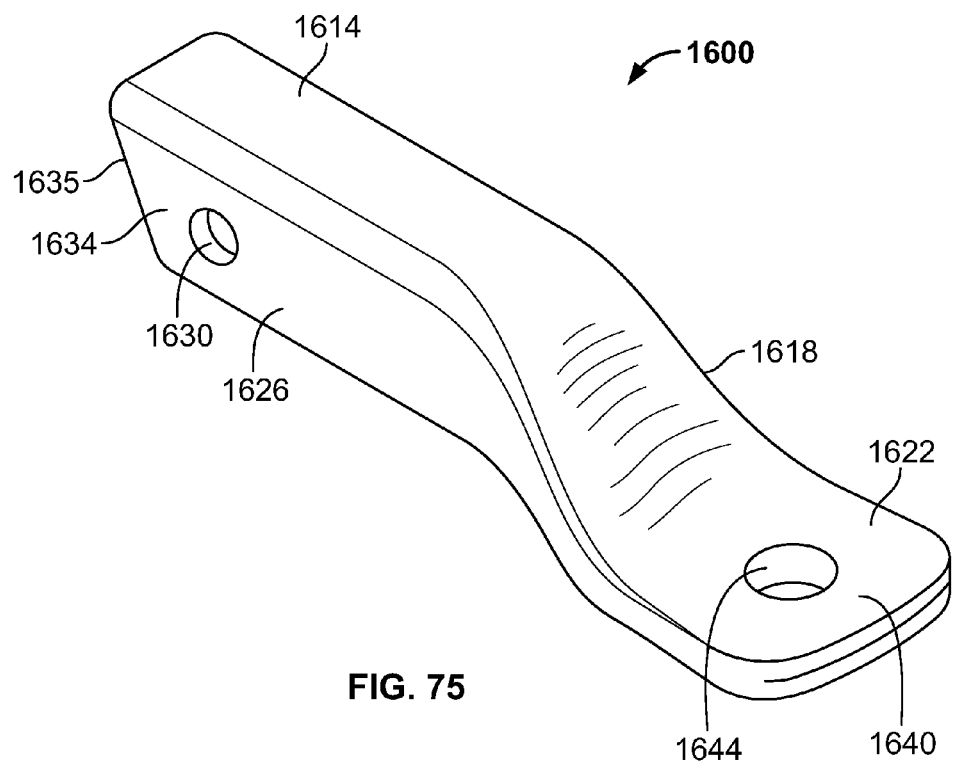
FIG. 75 is a perspective view of embodiments of a hitch ball mount.
Figure 76:
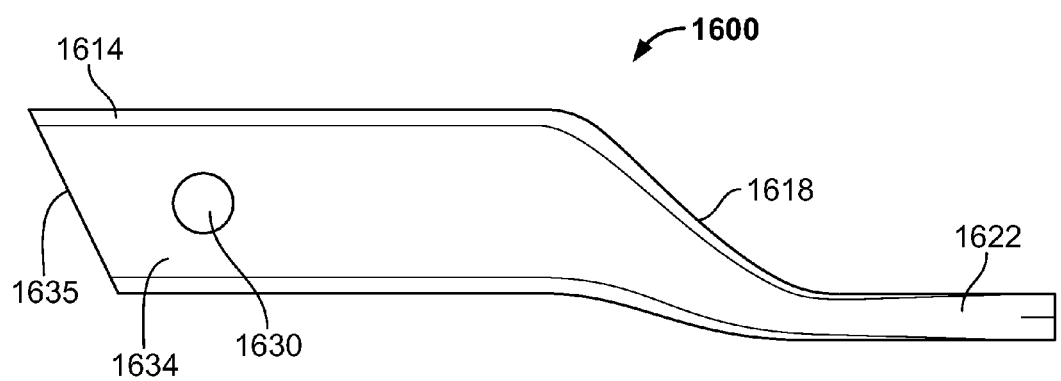
FIG. 76 is a side view of the hitch ball mount of FIG. 75.

A hitch ball mount 1600 may be formed as a monolithic unit or otherwise may be integrally formed. The hitch ball mount 1600 may include a hitch receiver attachment portion 1614, a drop portion 1618 and a hitch ball mount portion or tongue 1622, as shown in FIGS. 75-76. The hitch receiver attachment portion 1614 may include a tubular portion 1626. The tubular portion 1626 may be of any appropriate shape such that it may be capable of operatively engaging a hitch receiver in any appropriate manner. By way of a non-limiting example, the tubular portion 1626 may be of a generally rectangular shape. The tubular portion 1626 may include a pair of transverse apertures 1630 located on at least two sides 1634 of the tubular portion 1626. The tubular portion 1626 may further include a generally angled end portion 1635. The angled end portion 1635 may make it easier to load the tubular portion 1626 into mating engagement with the applicable hitch receiver.

The drop portion 1618 of the hitch ball mount 1600 may extend generally between the hitch receiver attachment portion 1614 and the tongue 1622. The drop portion 1618 may be of any appropriate distance. In some embodiments, the drop portion 1618 may be a zero drop. The appropriate distance of the drop portion 1618 may be based upon the distance the tongue 1622 may be desired to extend from the hitch receiver attachment portion 1614 to account for the use of the hitch ball mount 1600.

The tongue 1622 may extend from the drop portion 1618. The tongue 1622 may include a hitch ball aperture 1644 positioned on the upper surface 1640 of the tongue 1622 and may extend through the tongue 1622. The hitch ball aperture 1644 may be shaped and sized to receive a hitch ball in any appropriate manner.

Figure 77:
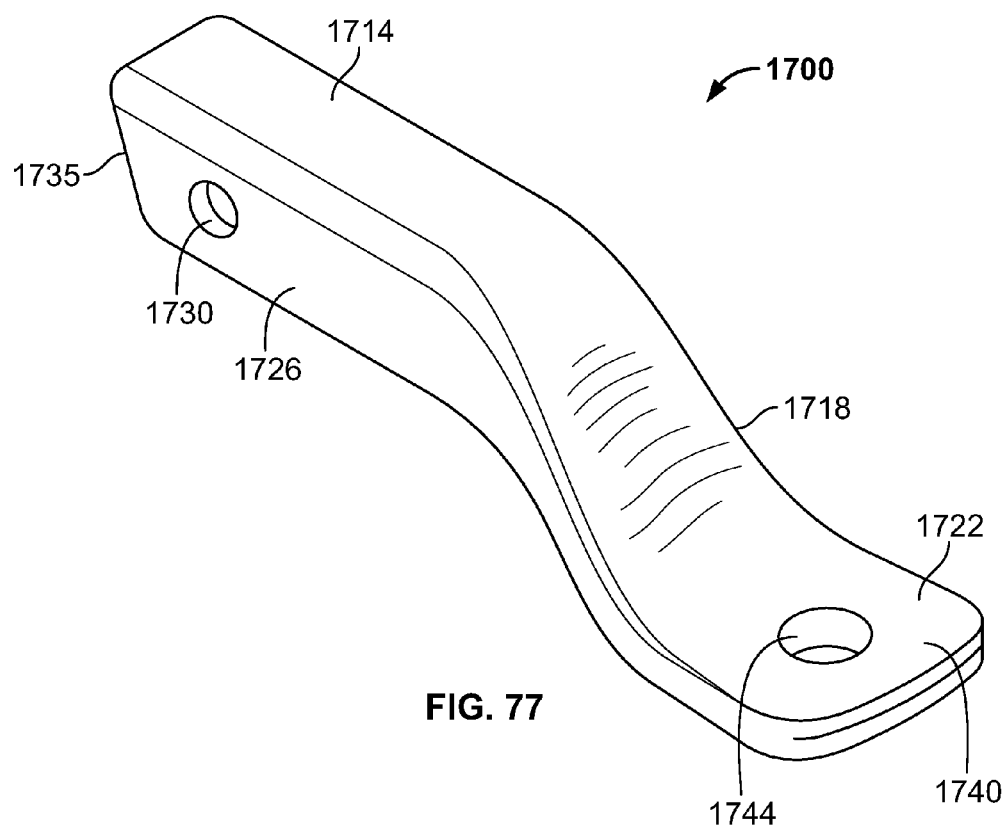
FIG. 77 is a perspective view of embodiments of a hitch ball mount.
Figure 78:
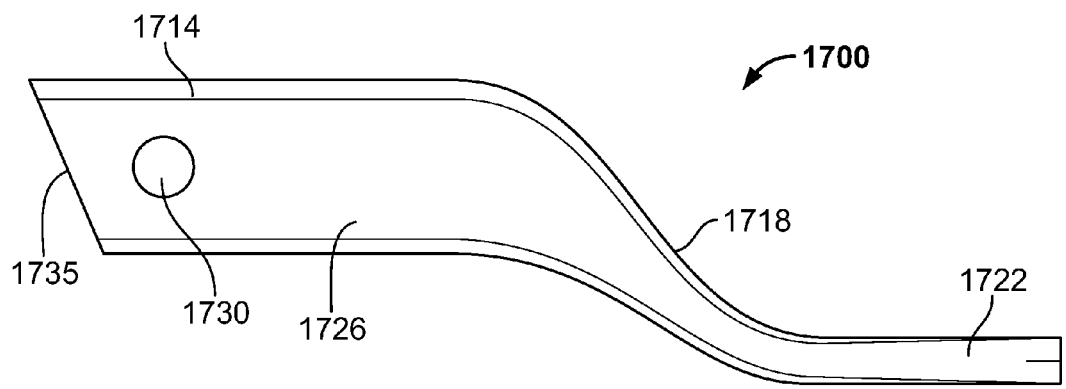
FIG. 78 is a side view of the hitch ball mount if FIG. 77.

A hitch ball mount 1700 may be formed as a monolithic unit or otherwise may be integrally formed. The hitch ball mount 1700 may include a hitch receiver attachment portion 1714, a drop portion 1718 and a hitch ball mount portion or tongue 1722, as shown in FIGS. 77-78. The hitch receiver attachment portion 1714 may include a tubular portion 1726. The tubular portion 1726 may be of any appropriate shape such that it may be capable of operatively engaging a hitch receiver in any appropriate manner. By way of a non-limiting example, the tubular portion 1726 may be of a generally rectangular shape. The tubular portion 1726 may include a pair of transverse apertures 1730 located on at least two sides 1734 of the tubular portion 1726. The tubular portion 1726 may further include a generally angled end portion 1735. The angled end portion 1735 may make it easier to load the tubular portion 1726 into mating engagement with the applicable hitch receiver.

The drop portion 1718 of the hitch ball mount 1700 may extend generally between the hitch receiver attachment portion 1714 and the tongue 1722. The drop portion 1718 may be of any appropriate distance. In some embodiments, the drop portion 1718 may be a zero drop. The appropriate distance of the drop portion 1718 may be based upon the distance the tongue 1722 may be desired to extend from the hitch receiver attachment portion 1714 to account for the use of the hitch ball mount 1700.

The tongue 1722 may extend from the drop portion 1718. The tongue 1722 may include a hitch ball aperture 1744 positioned on the upper surface 1740 of the tongue 1722 and may extend through the tongue 1722. The hitch ball aperture 1744 may be shaped and sized to receive a hitch ball in any appropriate manner.

While the present teachings disclose stamping as a method of forming the hitch ball mount, the present teachings are not limited to such. Any appropriate process may be used to form the hitch ball mount. By way of a non-limiting example, the hitch ball mount may be formed by hydro-forming, particularly, the hitch ball mounts 1100, 1200. In these embodiments, a generally planar plate may be placed in a die. A bladder may begin to engage the generally planar plate and may stamp the generally planar plate forming the hitch ball mounts 1100, 1200. Hydraulic fluid may be used with the bladder to form the appropriate the hitch ball mounts 1100, 1200. Hydro-forming may be used to generally avoid contact points and to spread out the stress over substantially all of the hitch ball mounts 1100, 1200. The present teachings, however, are not limited to a specific stamping process. Any kind of appropriate process may used without departing from these teachings.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A hitch ball mount comprising:
a generally tubular body having first and second end portions, the first end portion engageable with a hitch receiver of a towing vehicle, the tubular body including a pair of transverse apertures;
a drop portion monolithic with the tubular body and formed between the first and second end portions of the tubular member;
a hitch ball mounting portion monolithic with the drop portion and tubular body, the hitch ball mounting portion formed at the second end portion of the tubular member and extending from the drop portion, wherein a hitch ball is selectively attachable to the hitch ball mounting portion and;
a seam located in at least a portion of the hitch ball mounting portion.

2. The hitch ball mount of claim 1, wherein the tubular body is stamped to form the monolithic drop portion and hitch ball mounting portion.

3. The hitch ball mount of claim 1, wherein the seam includes a generally protective layer.

4. The hitch ball mount of claim 3, wherein the protective layer includes welding.

5. The hitch ball mount of claim 3, wherein the protective layer includes a coating generally preventing corrosion.

6. The hitch ball mount of claim 1, further comprising an axial through-hole extending through the hitch ball mounting portion and an acircular recess, wherein the acircular recess is positioned axially relative to the through-hole with the through-hole being within the recess.

7. The hitch ball mount of claim 6, further comprising a hitch ball having a base, a portion of the hitch ball inserted into the through-hole, wherein the base includes a perimeter, whereby a majority portion of the perimeter of the base is engageable with the recess to prevent rotation of the hitch ball during installation.

8. The hitch ball mount of claim 7, wherein the acircular recess includes a sidewall and the majority portion of the perimeter is engageable with the sidewall to prevent rotation of the hitch ball during installation of a nut.

9. The hitch ball mount of claim 8, wherein the acircular recess is a first acircular recess and wherein the hitch ball mounting portion includes a first face, the first acircular recess positioned on the first face.

10. The hitch ball mount of claim 9, further comprising a second face positioned on the hitch ball mounting portion opposite the first face, the second face including a second acircular recess, whereby the second acircular recess is positioned axially relative to the through-hole with the through-hole being within the second recess.

11. The hitch ball mount of claim 10, wherein the majority portion of the perimeter of the base is engageable with the second recess to prevent rotation of the hitch ball during installation.

12. A hitch ball mount capable of securing a hitch ball to a hitch receiver of a towing vehicle, the hitch ball mount comprising:
a generally tubular body having first and second end portions and a cavity therebetween, the first end portion being engageable with the hitch receiver;
a drop portion monolithic with the tubular body and formed between the first and second end portions of the tubular member;

a hitch ball mounting portion monolithic with the drop portion and tubular body, the hitch ball mounting formed at the second end portion of the tubular member and extending from the drop portion, wherein hitch ball mounting portion is generally free of the cavity;

the hitch ball mounting portion includes a tongue having an axial through-hole extending through the tongue and a recess wherein the recess is positioned axially relative to the through-hole with the through-hole being within the recess; and a seam located in at least a portion of the hitch ball mounting portion.

13. The hitch ball mount of claim 12, wherein the recess is an acircular recess.

14. The hitch ball mount of claim 12, wherein the first end portion of the tubular member includes a generally slanted end and an aperture capable of receiving a hitch pin.

15. The hitch ball mount of claim 12, wherein the drop portion and the hitch ball mount portion are formed by stamping the tubular member.

16. The hitch ball mount of claim 15, wherein the stamped drop portion and hitch ball mount portion are formed in a single stamping operation.

17. A hitch ball mount capable of securing a hitch ball to a hitch receiver, the hitch ball mount comprising:
a generally tubular body having first and second end portions, the first end portion engageable with a hitch receiver of a towing vehicle, the tubular body including at least one aperture to receive a pin therein and operatively attach to the hitch receiver;
a drop portion monolithic with the tubular body and formed between the first and second end portions of the tubular member;
a hitch ball mounting portion formed with and adjacent to the drop portion free of welding between the hitch ball mounting portion and the drop portion; and
a seam located in at least a portion of the hitch ball mounting portion.

18. The hitch ball mount of claim 17, wherein the drop portion is formed by stamping the tubular member between the first and second end portions.

19. The hitch ball mount of claim 18, wherein the hitch ball mount is formed by stamping the tubular member at the second end portion.

20. A hitch ball mount capable of securing a hitch ball to a hitch receiver, the hitch ball mount comprising:
a monolithic tubular member comprising
a first section having a cavity extending a longitudinal length, the first section including a pair of transverse apertures;
a second section extending from the first section; and
a third section extending from the second section, the third section being generally flattened such that an interior top portion of the tubular member and an interior bottom portion of the tubular member are in proximity to one another and the third section being generally free of the cavity, wherein the hitch ball is capable of being secured to the third section.

21. The hitch ball mount of claim 20, wherein flattening the third section generally eliminates the cavity from the third section.

22. The hitch ball mount of claim 21, wherein the first section is a generally tubular member having first and section end portions, the first end portion capable of selective attachment to a towing vehicle.

23. The hitch ball mount of claim 22, wherein the second section is a drop portion monolithic with the tubular body and formed between the first and second end portions of the tubular member.

24. The hitch ball mount of claim 23, wherein the third section is a hitch ball mounting portion monolithic with the drop portion and tubular body, the hitch ball mounting portion formed at the second end portion of the tubular member and extending from the drop portion.

25. The hitch ball mount of claim 24, further comprising an axial through-hole extending through the hitch ball mounting portion and an acircular recess, wherein the acircular recess is positioned axially relative to the through-hole with the through-hole being within the recess.

26. A hitch ball mount comprising:
a tubular member having first and second end portions, the tubular member including a pair of transverse apertures;
a drop formed by stamping the tubular member between the first and second end portions; and
a hitch ball mounting portion formed by stamping the tubular member at the second end portion, the hitch ball mounting portion including a seam, wherein a hitch ball is selectively attachable to the hitch ball mounting portion.

27. A hitch ball mount capable of securing a hitch ball to a hitch receiver, the hitch ball mount comprising:
a hitch receiver portion capable of being selectively secured to the hitch receiver, the hitch receiver portion including an open end portion insertable into the hitch receiver, the hitch receiver portion including a pair of transverse apertures;
a drop portion adjacent to the hitch receiver portion;
a ball mounting portion adjacent to the drop portion, the ball mounting portion including a seam formed therein; and
wherein the hitch receiver portion, drop portion and ball mounting portions are monolithically formed.

28. The hitch ball mount of claim 27, wherein the ball mounting portion includes a first face and a second face opposite the first face.

29. The hitch ball mount of claim 28, further comprising an axial through-hole positioned in the ball mounting portion extending between the first and second faces of the ball mounting portion.

30. The hitch ball mount of claim 29, further comprising a first acircular recess having a perimeter on at least one of the first or second faces, the first acircular recess positioned axially relative to the through-hole with the through-hole being within the perimeter.

31. A hitch ball mount capable of securing a hitch ball to a hitch receiver, the hitch ball mount comprising:
a hitch receiver portion capable of being selectively secured to the hitch receiver, the hitch receiver portion having an internal cavity extending a longitudinal length, the hitch receiver including a pair of transverse apertures;
a drop portion adjacent to the hitch receiver portion;
a ball mounting portion adjacent to the drop portion, wherein the ball mounting portion is cavity free and includes a seam formed therein; and
wherein the hitch receiver portion, drop and ball mounting portions are formed from a monolithic member.

32. A hitch ball mount capable of securing a hitch ball to a hitch receiver, the hitch ball mount comprising:
a hitch receiver portion capable of being selectively secured to the hitch receiver, the hitch receiver portion having an internal cavity extending a longitudinal length, the hitch receiver including a pair of transverse apertures;

a ball mounting portion adjacent to the hitch receiver portion, wherein the ball mounting portion is cavity free and includes a seam formed therein; and wherein the hitch receiver portion and ball mounting portions are generally free of any welding.

33. A hitch ball mount capable of securing a hitch ball to a hitch receiver of a towing vehicle, the hitch ball mount comprising:

a generally tubular body having first and second end portions, the first end portion engageable with a hitch receiver of a towing vehicle, the generally tubular body including a pair of transverse apertures;

a drop portion monolithically formed from the tubular body between the first and second end portions of the tubular member;

a hitch ball mounting portion monolithically formed from the second end portion of the tubular member, wherein the hitch ball is selectively attachable to the hitch ball mounting portion; and a seam located in at least a portion of the hitch ball mounting portion.

34. The hitch ball mount of claim 27, wherein the hitch receiver portion is a generally tubular member.

35. The hitch ball mount of claim 27, wherein the hitch receiver portion includes a generally closed periphery in cross-section.

36. The hitch ball mount of claim 24 further comprising a seam located in a portion of the hitch ball mounting portion.

37. The hitch ball mount of claim 12, wherein the seam includes a generally protective layer.

38. The hitch ball mount of claim 17, wherein the seam includes a generally protective layer.

39. The hitch ball mount of claim 26, wherein the seam includes a generally protective layer.

40. The hitch ball mount of claim 27, wherein the seam includes a generally protective layer.

41. The hitch ball mount of claim 31, wherein the seam includes a generally protective layer.

42. The hitch ball mount of claim 32, wherein the seam includes a generally protective layer.

43. The hitch ball mount of claim 33, wherein the seam includes a generally protective layer.

44. A hitch ball mount capable of securing a hitch ball to a hitch receiver of a towing vehicle, the hitch ball mount comprising:

a generally tubular body having first and second end portions, the first end portion engageable with a hitch receiver of a towing vehicle;

a drop portion monolithically formed from the tubular body between the first and second end portions of the tubular member;

a hitch ball mounting portion monolithically formed from the second end portion of the tubular member, wherein the hitch ball is selectively attachable to the hitch ball mounting portion; and a seam located in at least a portion of the hitch ball mounting portion, wherein the seam includes a generally protective layer.

* * * * *